US012139383B1

(12) United States Patent
Yue

(10) Patent No.: US 12,139,383 B1
(45) Date of Patent: Nov. 12, 2024

(54) HYDRAULIC JACK

(71) Applicant: WALTON.K.K International Business Group, Inc., Wellington, FL (US)

(72) Inventor: Qingsheng Yue, Wellington, FL (US)

(73) Assignee: WALTON.K.K INTERNATIONAL BUSINESS GROUP, INC., Wellington, FL (US)

( * ) Notice: Subject to any disclaimer, the term of this patent is extended or adjusted under 35 U.S.C. 154(b) by 0 days.

(21) Appl. No.: 18/428,969

(22) Filed: Jan. 31, 2024

Related U.S. Application Data

(63) Continuation-in-part of application No. 18/220,066, filed on Jul. 10, 2023, now Pat. No. 11,952,248.

(51) Int. Cl.
*B66F 3/30* (2006.01)
*B66F 3/26* (2006.01)
*F15B 15/26* (2006.01)
*F15B 20/00* (2006.01)

(52) U.S. Cl.
CPC .................. *B66F 3/30* (2013.01); *B66F 3/26* (2013.01); *F15B 15/26* (2013.01); *F15B 20/00* (2013.01); *F15B 2015/267* (2013.01)

(58) Field of Classification Search
CPC .... B66F 13/00; B66F 3/30; B66F 3/24; B66F 3/247; B66F 3/38; B66F 5/04
See application file for complete search history.

(56) References Cited

U.S. PATENT DOCUMENTS

| | | | | |
|---|---|---|---|---|
| 2,330,518 A * | 9/1943 | Rothery | .................... | B66F 3/30 254/93 H |
| 2016/0194185 A1* | 7/2016 | Rogers, II | ................. | B66F 3/30 254/108 |

FOREIGN PATENT DOCUMENTS

| | | |
|---|---|---|
| GB | 535568 A * | 4/1941 |

* cited by examiner

*Primary Examiner* — Tyrone V Hall, Jr.
(74) *Attorney, Agent, or Firm* — Millen, White, Zelano & Branigan P.C.; Wan-Ching Montfort

(57) ABSTRACT

A hydraulic jack for providing safety and security is disclosed. The hydraulic jack comprises a hydraulic cylinder storing hydraulic fluid inside, and a piston installed in the hydraulic cylinder that is raised up from the hydraulic cylinder by pressure of the hydraulic fluid stored in the hydraulic cylinder, thereby a heavyweight can be lifted by the piston. The piston has at least one drill hole on its body thereof that has a determined diameter and is perpendicular to the piston. A security piece is attachable on a top portion of the hydraulic cylinder. The security piece comprises a pair of through holes, which align with at least one drill hole of the piston.

16 Claims, 22 Drawing Sheets

HYDRAULIC JACK

This application is a continuation-in-part application of U.S. patent application Ser. No. 18/220,066, filed on Jul. 10, 2023, titled "A Hydraulic Jack" the full disclosure of which is hereby incorporated by reference and priority of which is hereby claimed.

FIELD OF THE INVENTION

The invention relates to a hydraulic jack. More particularly, the present invention relates to a hydraulic jack with safety equipment that provides safety to users when using the hydraulic jack.

DESCRIPTION OF THE RELATED ART

Hydraulic jacks are a type of mechanical devices used to lift heavy-weight objects, such as a vehicle. In the automobile industries, hydraulic jacks are known as a kind of hydraulic car jack. The hydraulic jack is an indispensable repair tool that accompanies the car and is used to lift the car up for easy repair. Traditional hydraulic jacks need to be used with a jack stand to prevent sudden slipping for safety reasons. Because the jack self-generated anti-slip relies on a one-way liquid valve, it is not reliable and there is a possibility of accidents.

In general, a hydraulic jack comprises a large piston and a small piston inside a big hydraulic fluid cylinder and a small hydraulic fluid cylinder, respectively. The big and the small cylinders contain hydraulic fluid and are connected together. The small piston forces the fluid to lift the large piston. There are two ball valves that work as a check valve, for allowing and stopping flow while pumping. With such a hydraulic jack, loads of up to several tons can be lifted. The force of a hydraulic jack can be calculated with pascal's law. More details of a general hydraulic jack will be described in the section of the Detail Description of Preferred Embodiments with reference to FIGS. 3 and 4.

As the car hydraulic jack can lift up to several-ton heavyweights, the federal Occupational Safety and Health Administration (OSHA) has setup standards applicable to levers and ratchets, screws, and the hydraulic jacks. The most common hazards associated with jack use are collapse from trying to lift beyond the capacity of the jack, jack placement on uneven surfaces, and a load slipping off the jack. Therefore, a hydraulic jack should be complemented with a jack stand when being put under a car before a user starts working under the car.

However, even with a jack stand, it is still not completely safe to users. Therefore, a new design of the hydraulic jack that provides more secured safety is desirable.

There are patented products on the market that place the jack stand side by side with the hydraulic jack by welding, the problem of which is that it is bulky and inconvenient to carry.

SUMMARY OF THE INVENTION

An embodiment of a hydraulic jack with a safety device is disclosed. The hydraulic jack comprises a hydraulic cylinder storing hydraulic fluid inside, a piston installed in the hydraulic cylinder that is raised up from the hydraulic cylinder by pressure of the hydraulic fluid stored in the hydraulic cylinder, wherein the piston has at least one drill hole on a body thereof, the drill hole has a determined diameter and is perpendicular to the piston, a security portion installed on top of the hydraulic cylinder that has a diameter larger than that of the piston and a height large enough to surround a lower part of the piston, and a safety pin that passes through one of the at least one drill hole of the piston when the piston is raised up.

The security part incudes a pair of through holes located on a body of the security part in opposite positions and each of the pair of through holes aligns with the at least one drill hole. The safety pin penetrates in an order of a first through hole of the pair of the through holes, one of the at least one drill hole of the piston, and a second through hole of the pair of through holes to secure the piston in place.

The security portion is part of the hydraulic cylinder and is mounted integrally on the top of the hydraulic cylinder by welding, casting or hammering. The security portion may also be a separate piece and is attachable to the top of the hydraulic cylinder.

Further, the security portion includes a longitudinal through hole having a diameter larger than the diameter of the piston so that the security portion can pass through the piston from the top of the piston to attach to the top of the hydraulic cylinder.

An embodiment of a hydraulic jack including safety equipment is further disclosed. The hydraulic jack comprises a hydraulic cylinder storing hydraulic fluid inside and the hydraulic cylinder including a cylindrical body and a top portion, wherein the top portion includes a fastening part. A piston is installed in the hydraulic cylinder that is raised up from the hydraulic cylinder by pressure of the hydraulic fluid stored in the hydraulic cylinder. The piston is used to lift up a heavyweight, and the piston has at least one drill hole on a body thereof that has a determined diameter and is perpendicular to the piston. A security piece is attachable to the top portion of the hydraulic cylinder by means of the fastening part. The security piece includes a longitudinal through hole, of which a diameter is larger than the diameter of the piston so that the security piece can pass through the piston from top to bottom to contact with the top portion of the hydraulic cylinder. The security piece has a height large enough so that the security piece surrounds a lower portion of the piston, and a safety pin for inserting into the at least drill hole of the piston when the piston is raised up to secure the piston in place.

The pair of through holes are aligned with the at least one drill hole of the piston, and wherein the safety pin passes in an order of one of the pair of through holes of the security piece, one of the at least one drill hole of the piston, and the other one of the pair of through holes of the security piece.

Further, the fastening part of the top portion comprises screw threads. The security piece also comprises screw threads on an inner wall at a lower portion of the security piece. The screw threads of the security piece match and fasten with the screw threads of the fastening part so that they can be fastened together by a rotation motion.

Alternatively, the fastening part of the top portion comprises at least one recess and an inner wall at a lower portion of the security piece comprises at least one protrusion. The at least one protrusion and the at least one recess engage together when the security piece is attached to the top portion of the hydraulic cylinder.

Another embodiment of a hydraulic jack is also disclosed. In this embodiment, the hydraulic jack includes a hydraulic cylinder storing hydraulic fluid inside, the hydraulic cylinder including a cylindrical body and a top portion, wherein the top portion includes a receiving device on a top surface thereof. A security piece is attachable to the top portion of the hydraulic cylinder by means of the receiving device. The security piece includes a longitudinal opening of which a size larger than the diameter of the piston so that the security piece can pass through the piston from top to bottom to be placed in the receiving device of the top portion of the hydraulic cylinder, wherein the security piece has a height large enough so that the security piece surrounds a lower portion of the piston. A safety inserts to one drill hole of a piston of the hydraulic jack when the piston is raised up to secure the piston in place.

The receiving device of the large cylinder may be a circular recess that has a dimension substantially the same as a bottom dimension of the security piece so that the security piece can be properly placed in the circular recess. The receiving device may also include two recesses apart from each other, and the security piece includes two engaging parts that extend outwardly from a bottom of the security piece and correspond to the two recesses of the receiving device, The two engaging parts of the security piece are insertable into the two recesses of the receiving device so that the security piece is attached on the top portion of the large cylinder.

The receiving device may further include a magnet and a bottom of the security piece may include a magnetic material. The magnet of the receiving device has an opposite magnetism from the magnetic material of the security piece so that the security piece can be attached on the receiving device by means of a magnetic attraction.

Alternatively, the security piece is made of two half magnetic parts that can be attached together and placed on the receiving device of the large cylinder.

A further embodiment of a hydraulic jack with safety equipment is further disclosed. In this embodiment, the hydraulic jack includes a hydraulic cylinder storing hydraulic fluid therein that includes a cylindrical body and a top portion, wherein the top portion includes a fastening part. A piston is installed in the hydraulic cylinder that is raised up from the hydraulic cylinder by the pressure of the hydraulic fluid stored in the hydraulic cylinder. The piston is used to lift up a heavyweight, and has at least one drill hole on a body thereof. The at least one drill hole has a determined diameter and is perpendicular to the piston. A security piece is attachable to the top portion of the hydraulic cylinder by means of the fastening part. The security piece includes a longitudinal through hole of which a diameter is larger than the diameter of the piston so that the security piece can pass through the piston from top to bottom to contact with the top portion of the hydraulic cylinder. The security piece has a height large enough so that the security piece surrounds a lower portion of the piston. Further, the security piece comprises a pair of through holes on an outer wall thereof in opposite positions, and the pair of through holes are aligned with the at least one drill hole of the piston. A safety pin is used to insert to in an order of one of the pair of through holes of the security piece, one of the at least one drill hole of the piston, and the other one of the pair of through holes of the security piece when the piston is raised up to secure the piston in place.

In the above embodiment, the safety pin is connected to the outer wall of the security piece through an extension cord. The safety pin may also be connected to an outer wall of the hydraulic cylinder through an extension cord.

Further, the fastening part of the top portion comprises screw threads, and an inner wall at a lower portion of the security piece comprises screw threads that match and fasten with the screw threads of the fastening part.

BRIEF DESCRIPTION OF THE DRAWINGS

Various other features and attendant advantages of the present invention will be more fully appreciated when considered in conjunction with the accompanying drawings.

DETAILED DESCRIPTION OF THE PREFERRED EMBODIMENTS

Reference will now be made in detail to specific embodiments of the present invention. Examples of these embodiments are illustrated in the accompanying drawings. Numerous specific details are set forth in order to provide a thorough understanding of the present invention. While the embodiments will be described in conjunction with the drawings, it will be understood that the following description is not intended to limit the present invention to any one embodiment. On the contrary, the following description is intended to cover alternatives, modifications, and equivalents as may be included within the spirit and scope of the appended claims. Numerous specific details are set forth in order to provide a thorough understanding of the present invention.

Figure 1:
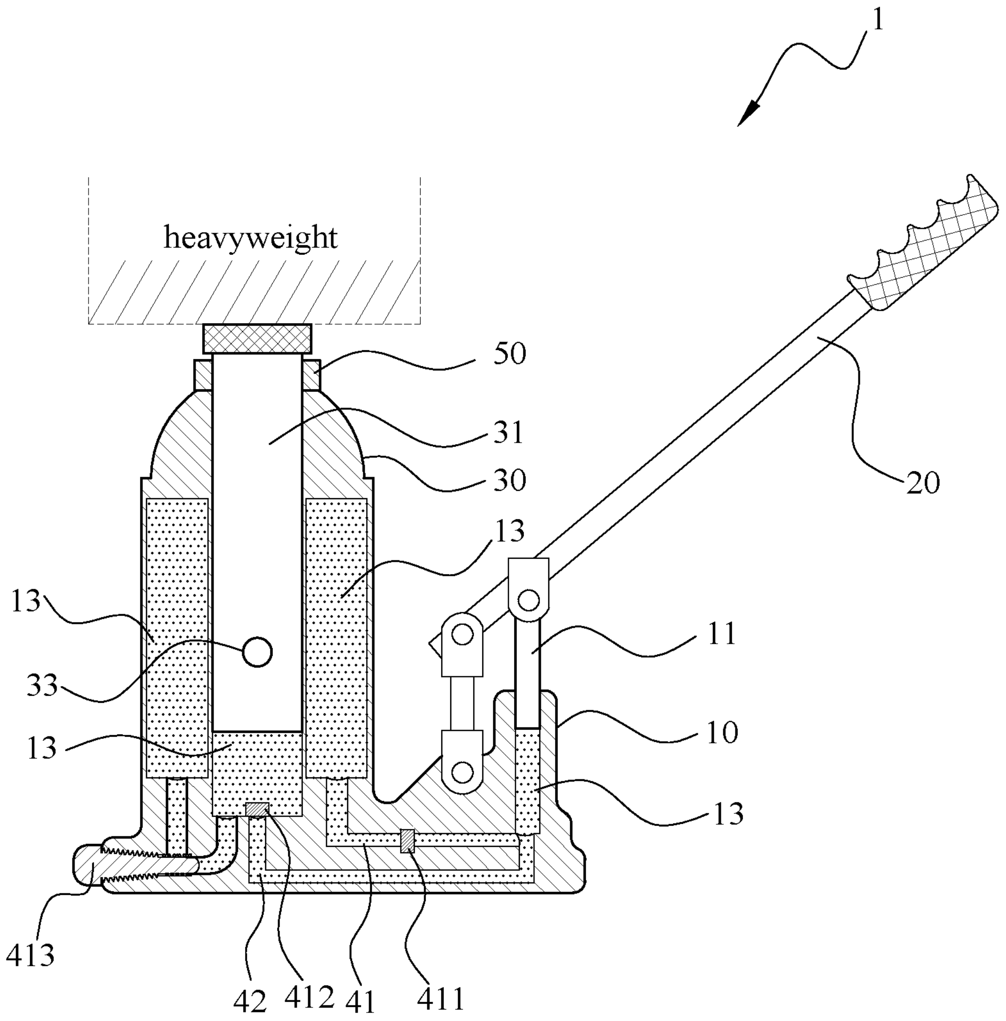
FIG. 1 is a schematic diagram of a hydraulic jack in accordance with the disclosed embodiments.
Figure 2:
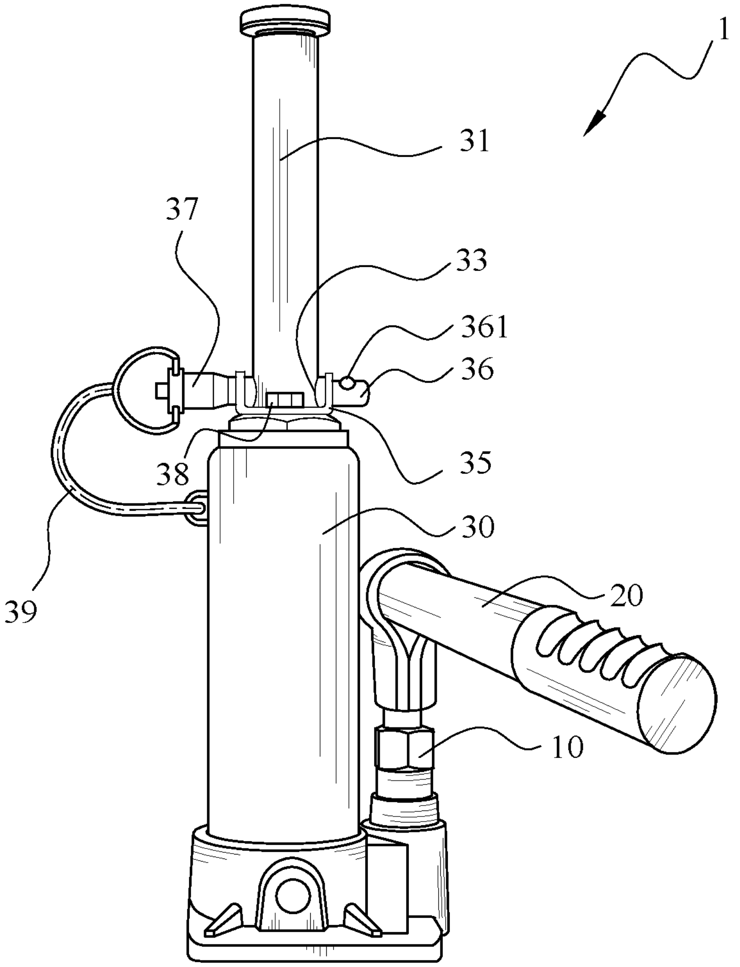
FIG. 2 illustrates a partial sectional-view diagram of the hydraulic jack in accordance with the preferred embodiments.
Figure 4:
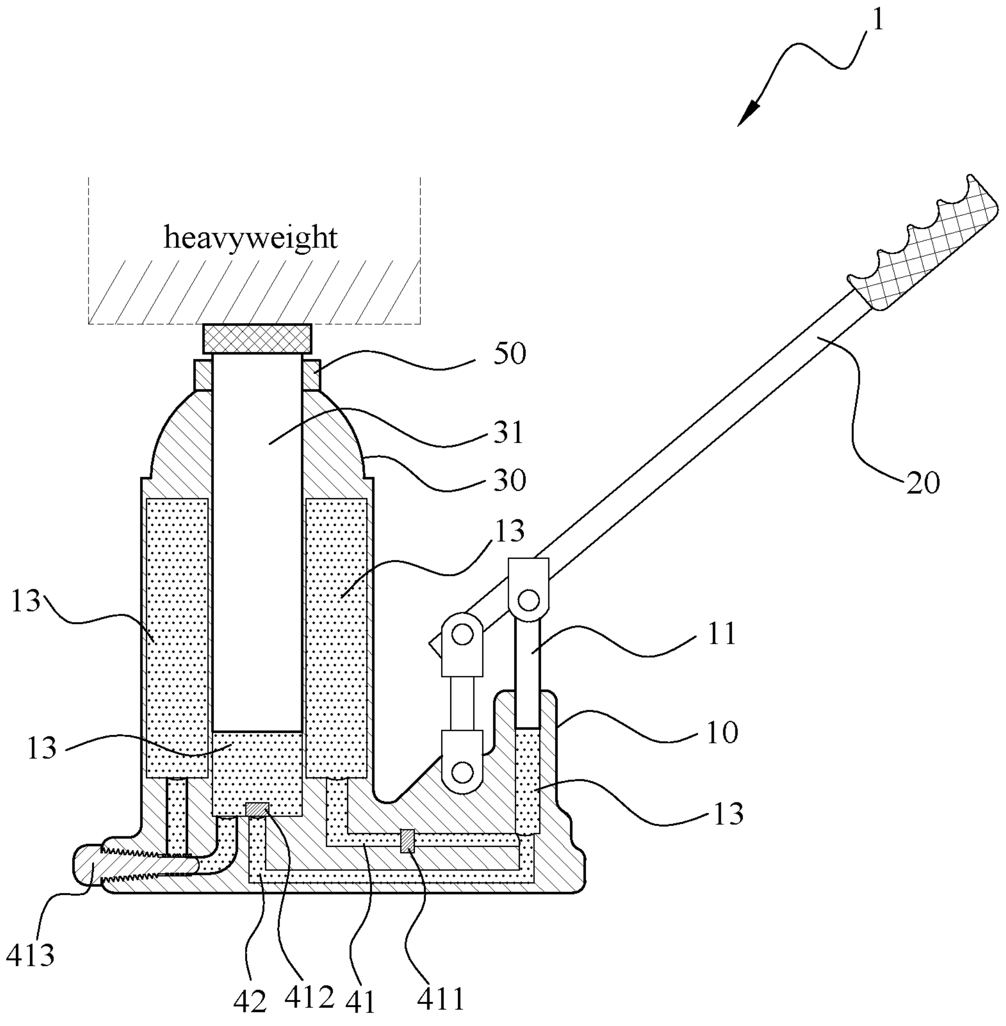
FIG. 4 is a schematic diagram of a conventional hydraulic jack used in the industry.
Figure 5:
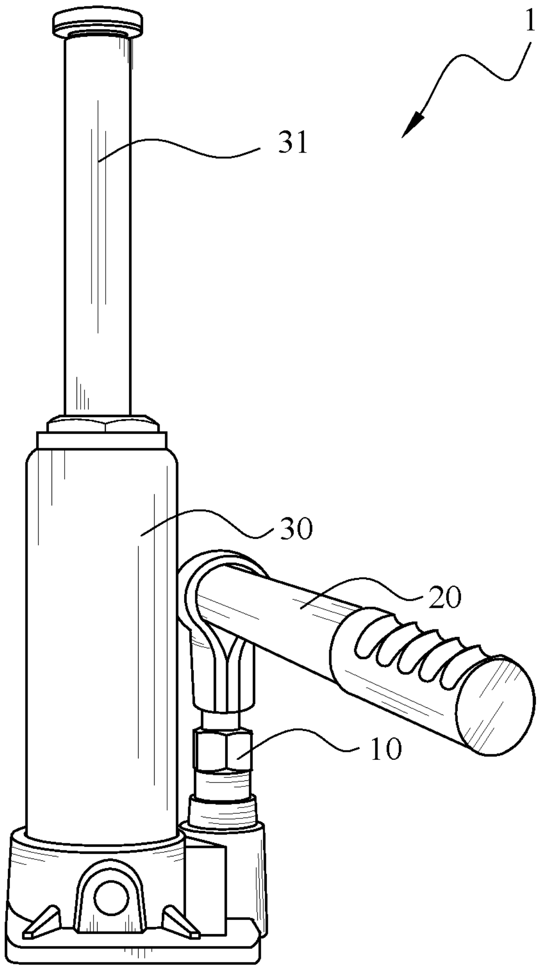
FIG. 5 illustrates a partial sectional-view diagram of the hydraulic jack of FIG. 4.

FIG. 1 is a schematic diagram of a hydraulic jack 1 in accordance with the preferred embodiments. It is noted that the hydraulic jack shown in FIG. 1 is a bottle hydraulic jack and is for exemplary purposes only. Different types of hydraulic jacks may also be used. To understand how a hydraulic jack works, FIG. 4 illustrates a partial section diagram general hydraulic jack 4 used in the industry. FIG. 2 shows a partial section diagram of hydraulic jack 1 in accordance with the preferred embodiments. FIGS. 1 and 4 show that the interior of hydraulic jack 1 of the preferred embodiments is similar to hydraulic jack 41, except that large piston 31 has a drill hole on the body with a suitable diameter that is perpendicular to the large piston. FIG. 5 also shows a schematic diagram of a general hydraulic jack 4 used in the industry.

The detailed description of the preferred embodiments starts with explaining how a hydraulic jack generally works by referring to FIGS. 1 and 4. In the following descriptions, similar elements of the conventional hydraulic jack 4 shown in FIG. 4 and the hydraulic jack 1 shown in FIG. 1 of the preferred embodiments will be marked as same reference numbers for the purpose of brevity.

FIG. 4 illustrates a partial sectional diagram of a general hydraulic jack 4 used in the industry. As shown, hydraulic jack 4 comprises a small hydraulic cylinder 10 and a large hydraulic cylinder 30. Small piston 11 and large piston 31 are installed inside small hydraulic cylinder 10 and large hydraulic cylinder 30, respectively. Hydraulic fluid is filled in reservoir 13 between the small hydraulic cylinder 10 and large hydraulic cylinder 30 and flows between the two cylinders through fluid channel 41 and fluid channel 42. By pressuring the hydraulic fluid with small piston 11 (or pump piston or pump plunger) it will move large piston 31 upward with a great force.

Lever 20 is used to control the movement of small piston 11 of small hydraulic cylinder 10. Small piston 11 is extendable outwardly from small hydraulic cylinder 10 by the control of lever 20. Large piston 31 is also extendable outwardly from the top of large hydraulic cylinder 30 by a force generated from small piston 11. In general, small piston 11 may also be called a pump piston or a pump plunger and large piston 31 may be called working piston. A single-direction valve 411 and a single-direction valve 412 are installed in fluid channels 41 and 42, in which valve 411 of fluid channel 41 is opened to allow the hydraulic fluid to flow into reservoir 13 of small hydraulic cylinder 10 when lever 20 is lifted up; while at the same time, valve 412 of fluid channel 42 is closed. Valve 411 of fluid channel 41 is closed and valve 412 of the fluid channel 42 is opened to allow the fluid channel to flow into reservoir 13 of large hydraulic cylinder 30 when lever 20 is pushed down. The down force of lever 20 moves small piston 11 downwardly to pressurize hydraulic fluid 13, thereby moving large piston 31 upward with great force. With such a hydraulic jack, loads of up to several tons can be lifted. The increase in force is in part due to the Pascal principle, which is well-known in the skilled art.

The valves 411 and 412 of fluid channels 41 and 42 may be in a form of a ball. During the upward movement of the small piston 11 (i.e. pump piston or pump plunger), the hydraulic oil is sucked into the small cylinder 10 (or called pump cylinder). After the inflow, the ball in the large hydraulic cylinder 30 (or called working cylinder) falls down due to gravity. The high pressure in the working cylinder presses the ball firmly into a valve seat, thus preventing the hydraulic oil from flowing back into the pump cylinder. The pumping process can now start again from the beginning, as the ball in the pump cylinder is lifted by the suction and hydraulic fluid can be sucked into the pump cylinder. Note that due to check valves (not shown), the hydraulic oil in the working cylinder is kept permanently under pressure, while the oil in the reservoir always remains unpressurized.

The above cycles will be repeated several times until the heavyweight on the top of large hydraulic cylinder 30 is lifted to a determined distance. To lower the large piston again, a release valve 413 is opened, which connects large hydraulic cylinder 30 directly to reservoir 13. During lifting, this passage may be sealed with a steel ball (not shown) which is pressed firmly into release valve 413 with a screw. If release valve 413 is unscrewed, the ball releases the passage and the hydraulic oil is pushed back into reservoir 13 under the force of gravity.

In order to protect jack 4 from damage in the event of overload, release valve 413 is designed as a safety valve and is usually provided with a spring. If the pressure is too high, the spring is pushed back and the hydraulic oil can flow directly back into the reservoir without an unacceptably high pressure building up in the working cylinder.

Hydraulic jack 4 may further include a ram 50 that is installed on the top of large hydraulic cylinder 30 on the circumference of large piston 31.

FIGS. 1-2 show a schematic diagram and a partial sectional-view diagram of hydraulic jack 1 in accordance with the preferred embodiments. As described above, the interior design of hydraulic jack 1 of FIG. 1 is similar to conventional hydraulic jack 4 of FIG. 4. The important features, however, of hydraulic jack 1 includes a drill hole 33 on large piston 31 that has a suitable diameter and is perpendicular to large piston 31. The location of drill hole 33 has no limitation based on the location of the pin bolt and a maximum force of pressurized hydraulic fluid pushed by small piston 11, as long as it is on a plane perpendicular to large piston 31.

FIG. 1 shows the schematic diagram of hydraulic jack 1 in accordance with the preferred embodiments. In FIG. 2, a safety pin or a pin bolt 36 is secured on a wall of large hydraulic cylinder 30, which is used to penetrate through drill hole 33 when the large piston 31 is raised. The purpose of safety pin 36 is to prevent large piston 31 from abruptly and unexpectedly slipping down based on an operation error or a malfunction of the valves of hydraulic fluid channels 41 and 42 or the heavyweight lifted by jack 1 is too heavy so as to avoid an accident.

Figure 3:
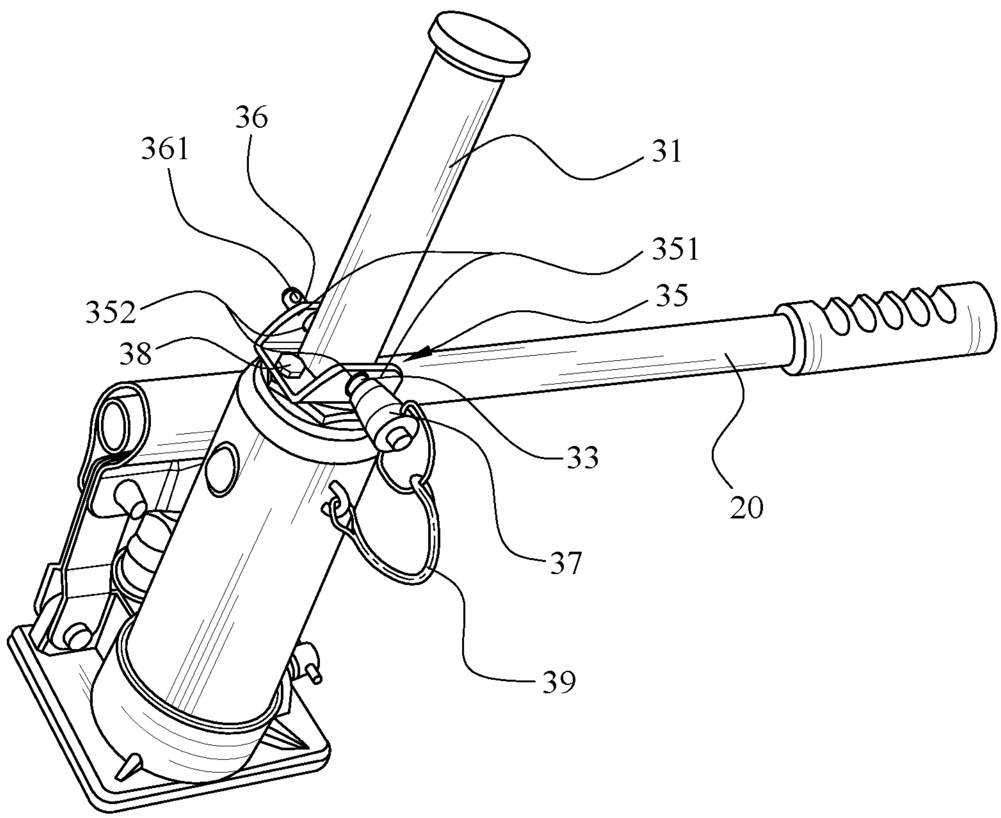
FIG. 3 illustrates another view of the hydraulic jack of FIG. 1 in accordance with the preferred embodiments.

Hydraulic jack 1 further includes a bracket 35 that is mounted to the top of the exterior wall of large hydraulic cylinder 30. FIG. 3 is another view of hydraulic jack in accordance with the preferred embodiments to show the detailed structure of bracket 35. In FIG. 3, bracket 35 includes a pair of supporting plates 351 surrounding large piston 31. Each of the pair of supporting plates 351 has a through hole 352. Through holes 352 are located in positions so that when large piston 31 is raised up, they are aligned with drill hole 33 of large piston 31. Once through holes 352 and drill hole 33 are aligned, safety bolt 36 is able to penetrate in the order of hole 352 of bracket 35, drill hole 33, and hole 352 of bracket 35 to secure large piston 31 in place. After use of hydraulic jack 1, safety pin 36 is pulled out from drill hole 33 and holes 351 and large piston 31 then will return to a stowed state after opening release valve 413.

The design of brackets 35 provides additional security to avoid sudden collapse of large piston 31, but not essentially necessary in accordance with the preferred embodiments. In some embodiments, bracket 35 can be omitted. The shape of bracket 35, however, is not limited to that shown in FIG. 3. Different shapes of supporting brackets can also be used. Hydraulic jack 1 of the preferred embodiment may also include spiral screw 37 that screws to safety pin 36 toward large piston after safety pin 36 spans into bracket 35 and penetrates through drill hole 33 to provide more security.

As described above, conventionally, a hydraulic jack should be complemented with a jack stand when being put under a car before a user starts working under the car. However, there is no guarantee that the jack stand provides 100 percentage safety to the users. Therefore, safety pin 36 and bracket 35, according to the preferred embodiments, are designed to provide further safety to users when using a hydraulic jack to lift up a heavy-weight object. In the case that the large piston slips unexpectedly, it will be stopped by safety pin 36 and will not further slide down, thereby avoiding an accident.

The preferred embodiment of FIG. 2 illustrates that safety pin 36 is attached to chain 39 that is mounted on the wall of hydraulic jack 1. However, safety pin 36 is not limited to be attached to chain 39. For example, safety pin 36 may be a separate part. Safety pin 36 and bracket 35 can also be a set sold separately from hydraulic jack 1. The form and shape of bracket 35 are also not limited to the design shown in FIG. 3. Any form and shape that provides similar functions of bracket 35 can also be used. In some preferred embodiments, safety pin 36 may have a slope to facilitate the safety pin access to bracket 35 and drill hole 33 of large piston 31.

In the preferred embodiment of FIG. 3, bracket 35 is mounted integrally on large hydraulic jack 30 by casting, welding, or hammering. As shown in FIG. 3, bracket 35 may also be a separate piece that is screwed to large hydraulic jack 30 by at least one screw 38 or attached to large hydraulic jack 30 in any appropriate manner. In an alternative embodiment, a fixed frame (not shown) can be used to attach to large hydraulic cylinder 30. The fixed frame may be formed by casting, welding, and hammering.

In some embodiments, safety pin 36 may have a bullet bean 361 (see FIG. 3) that is extended out after safety pin 36 in inserted into drill hole 33 to prevent safety pin from falling off drill hole 33.

Various bracket structures for providing additional support of the piston in a raise-up position are illustrated in FIGS. 6A-16. All of the embodiments shown in FIGS. 6A-15 include similar parts of the hydraulic jack 1 as shown in FIG. 1-3. In the following descriptions, some of the parts that have been described above with reference to FIGS. 1-3 will be omitted for the purpose of simplicity.

Figure 6A:
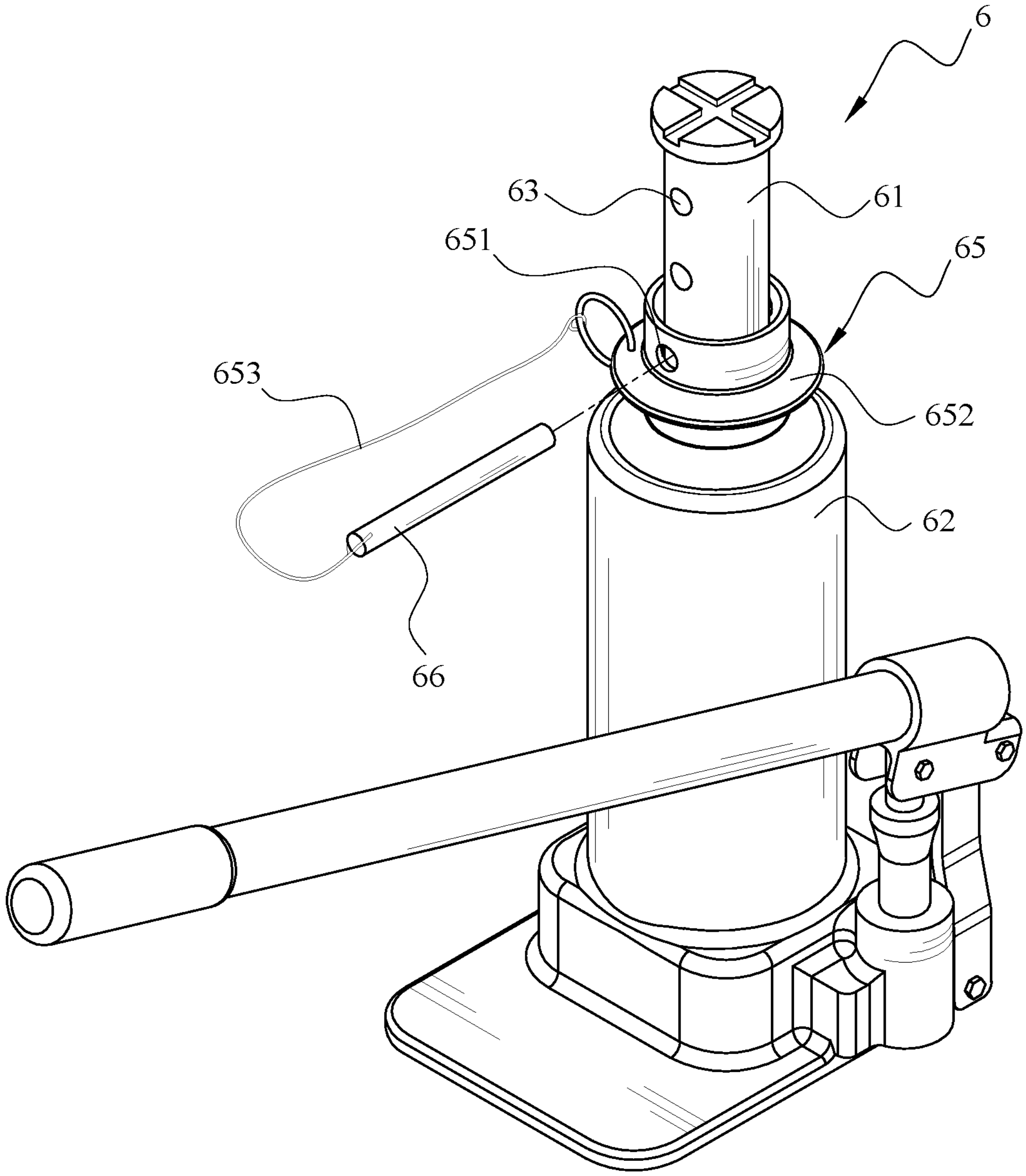
FIG. 6A illustrates a hydraulic jack in accordance with a second embodiment of the present invention.
Figure 6B:
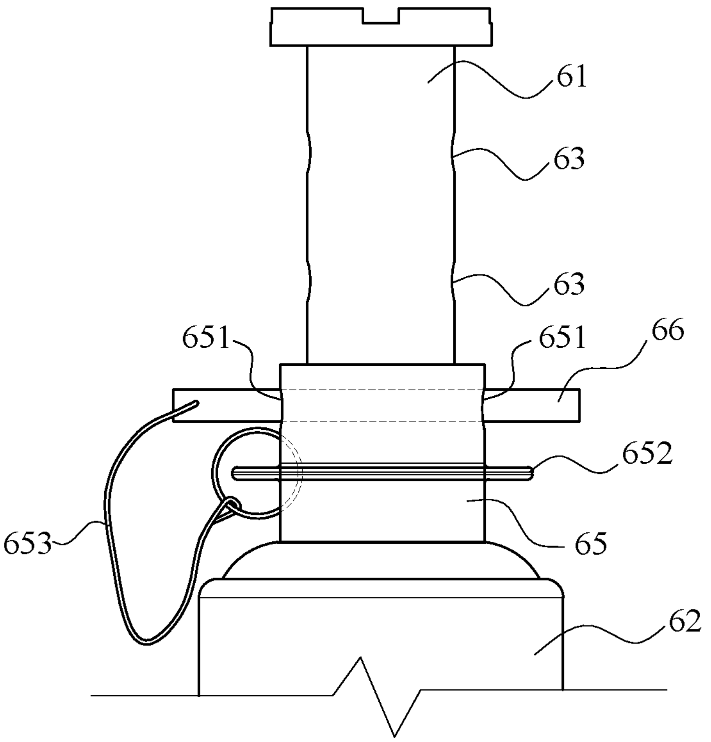
FIG. 6B is a side view of the hydraulic jack of FIG. 6A.
Figure 6C:
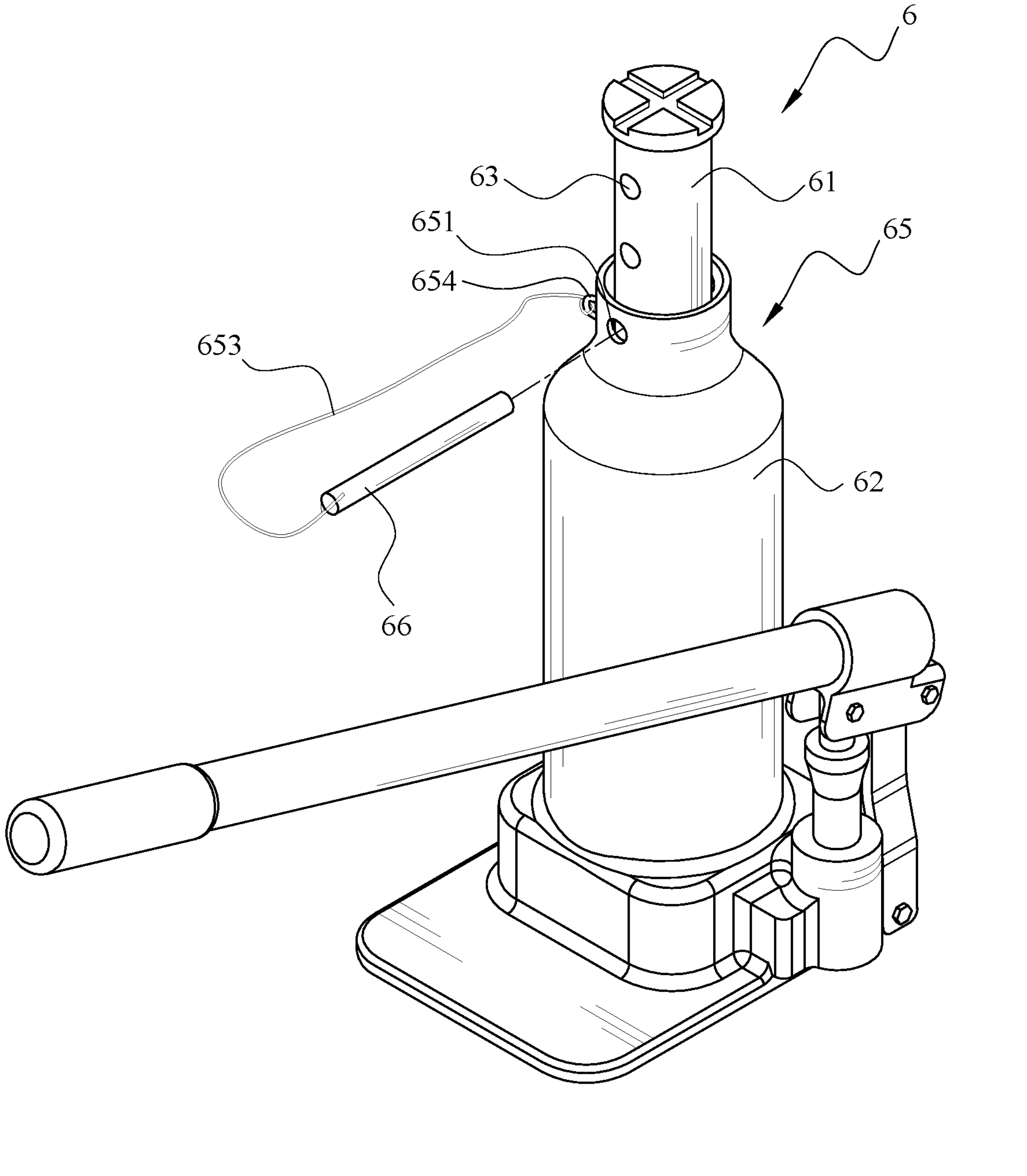
FIG. 6C illustrates an alternative hydraulic jack of FIG. 6A, in which ring 652 of FIG. 6A is omitted.

FIGS. 6A-6C illustrate a hydraulic jack 6 in accordance with a second embodiment of the present invention.

FIG. 6A is a perspective view of hydraulic jack 6, in which piston 61 of hydraulic jack 6 has one or more drill holes 63 along a longitudinal direction and large cylinder 62 includes a top portion 65 integrally formed on large cylinder 62. Top portion 65 has a predetermined height that overlaps a lower portion of piston 61 and the predetermined height of top portion 65 is large enough so that a pair of through holes 651 can be formed a body thereof. Top portion 65 may be in any appropriate form, such as a cylinder, a prism, a pentagon, hexagon, etc. . . . In the exemplary embodiment shown in FIGS. 6A and 6B, top portion 65 is in a form of cylinder and the pair of through holes 651 are formed on opposite sides of top portion 65, that will align with any one of drill holes 63 of piston 61 when piston 61 is raised up. Hydraulic jack 6 further includes safety pin 66 that can penetrate the pair of through holes 651 of top portion 65 and one drill hole 63 of piston 61 to secure piston 61 in place.

FIG. 6B shows a partial side view of hydraulic jack 6 after piston 61 is raised up and safety pin 66 is inserted into the pair of through holes 651 of top portion 65 and one drill hole 63 of piston 61. As shown, safety pin 66 penetrates in an order of one of the pair of through holes 651 of top portion 65, one of drill holes 63 of piston 61, and the other of the pair of through holes 651 of top portion 65 to secure piston 61 in place.

Figure 13:
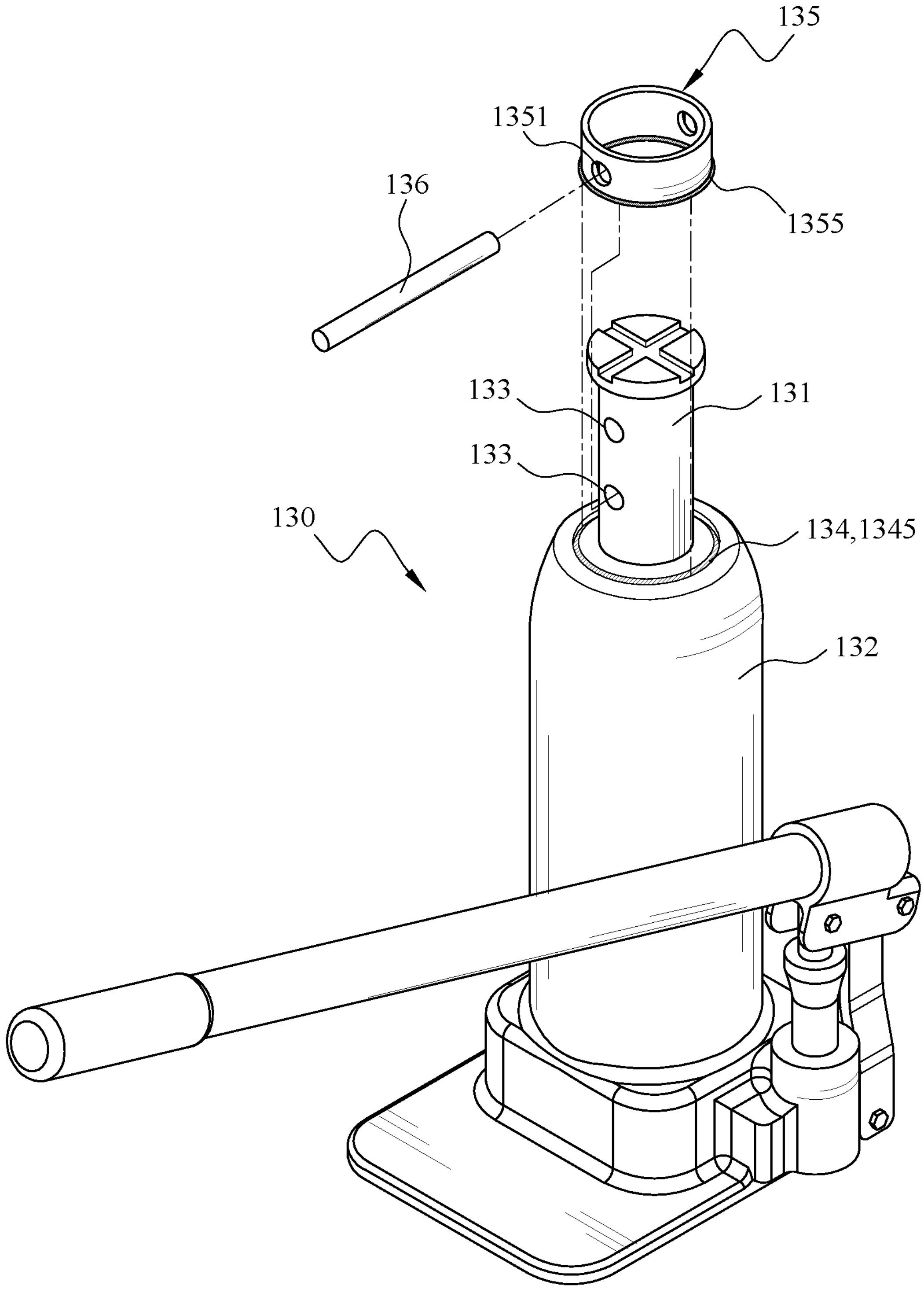
FIG. 13 illustrate a further design of a hydraulic jack in accordance with a ninth embodiment of the present invention.
Figure 14:
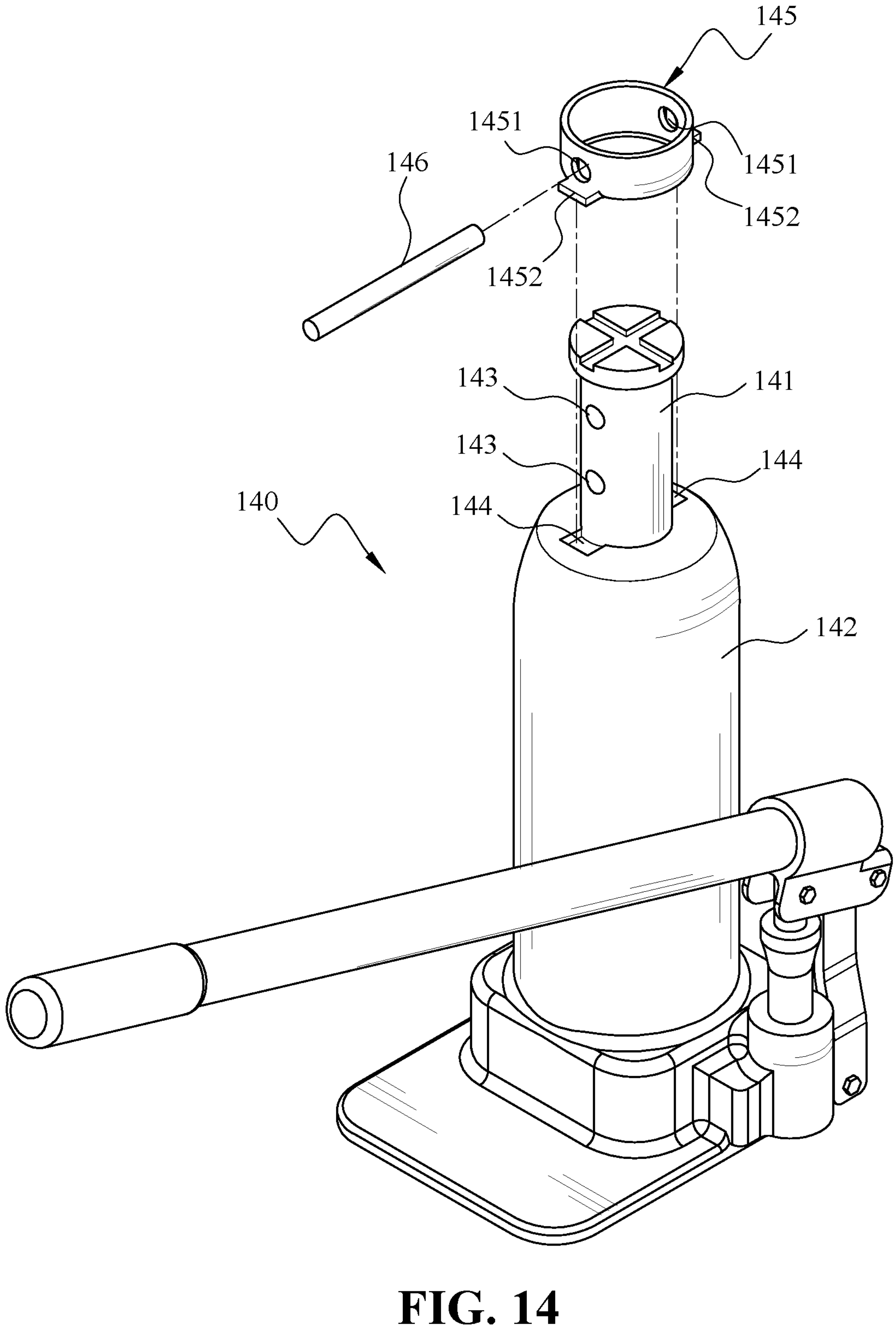
FIG. 14 illustrate a yet design of a hydraulic jack in accordance with a tenth embodiment of the present invention.
Figure 15:
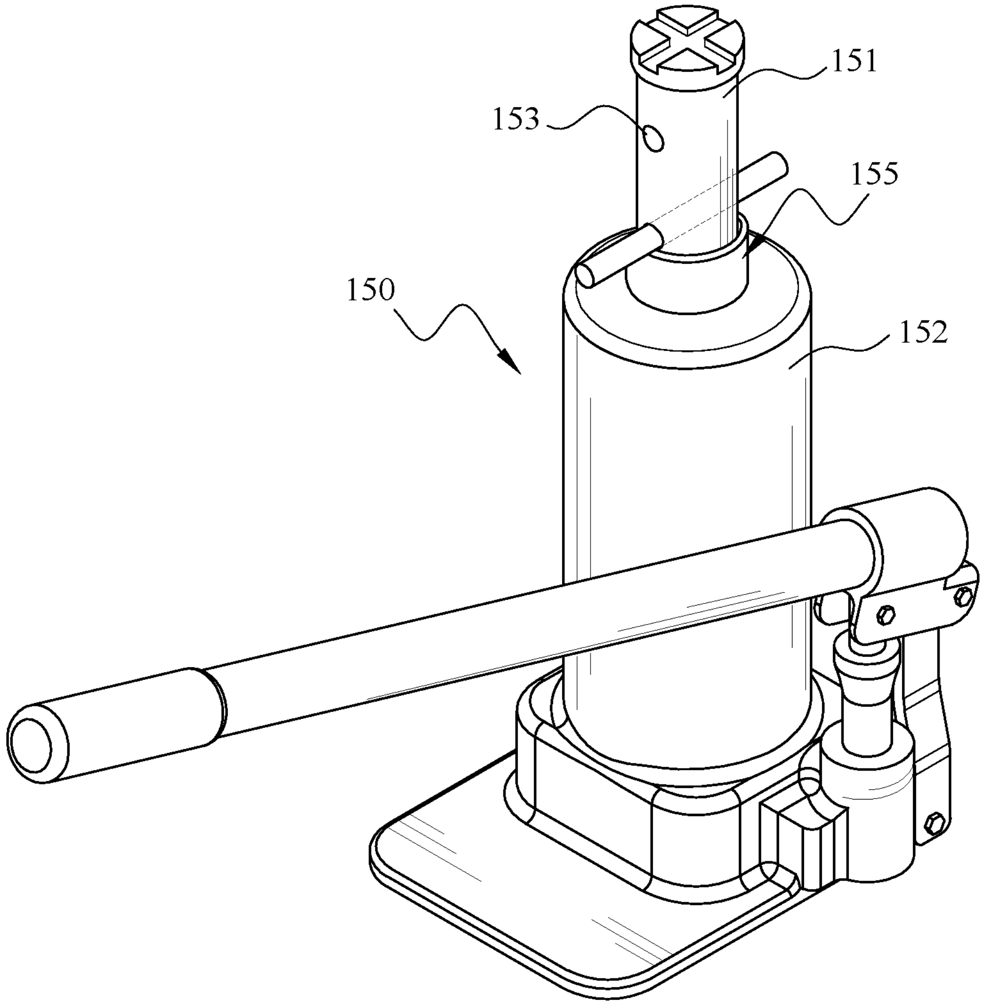
FIG. 15 illustrate a further design of a hydraulic jack in accordance with a eleventh embodiment of the present invention.

Safety pin 66 shown in FIGS. 6A and 6B is attached to ring 652 surrounding a circumference of top portion 65 with chain or an extension cord 653 so that safety pin 66 is a part of top portion 65 of large cylinder 62. However, safety pin 66 may be connected with a chain or extension cord that is mounted on the exterior wall of large cylinder 62 of hydraulic jack 6, as designed in FIGS. 2 and 3. In some embodiments, safety pin 66 is a separate piece and does not connect to any of top portion 65 and large cylinder 62, as shown in FIGS. 13-15 that will be described later.

Further, the designs of ring 652 are not limited to a circumferential ring as shown in FIG. 6A. To be clear, FIG. 6C shows that, circumferential ring 652 of top portion 65 of hydraulic jack 6 may be omitted. Instead, chain or extension cord 653 connecting safety pin 65 may be nailed, glued, or welded to the body of top portion 65 or connected to the body of top portion 65 by a small ring 654, similar to the manner shown in FIGS. 2 and 3.

Figure 7A:
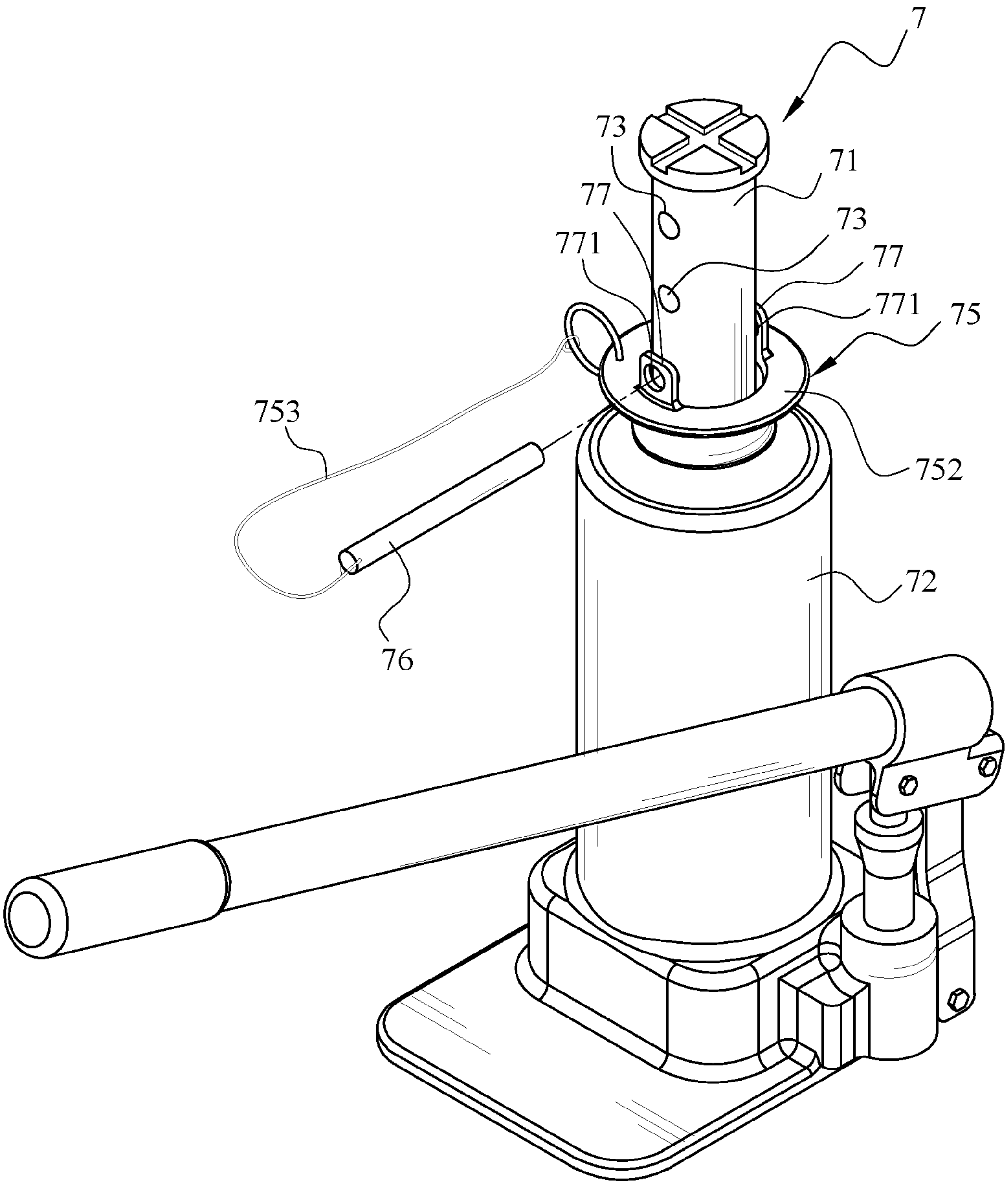
FIG. 7A illustrates a hydraulic jack in accordance with a third embodiment of the present invention.
Figure 7B:
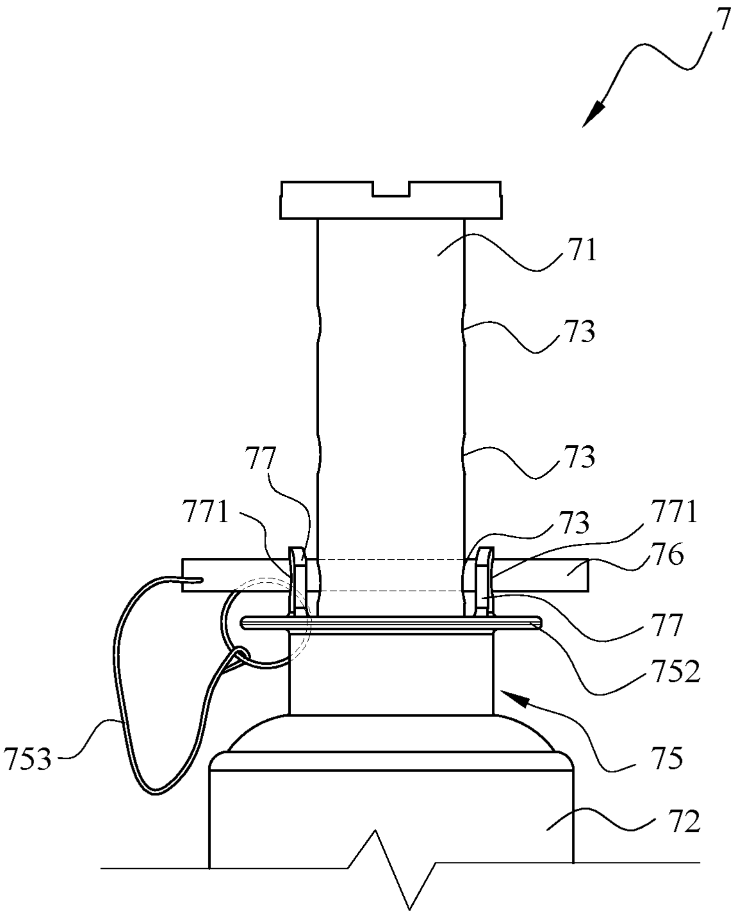
FIG. 7B is side view of the hydraulic jack of FIG. 7.
Figure 7C:
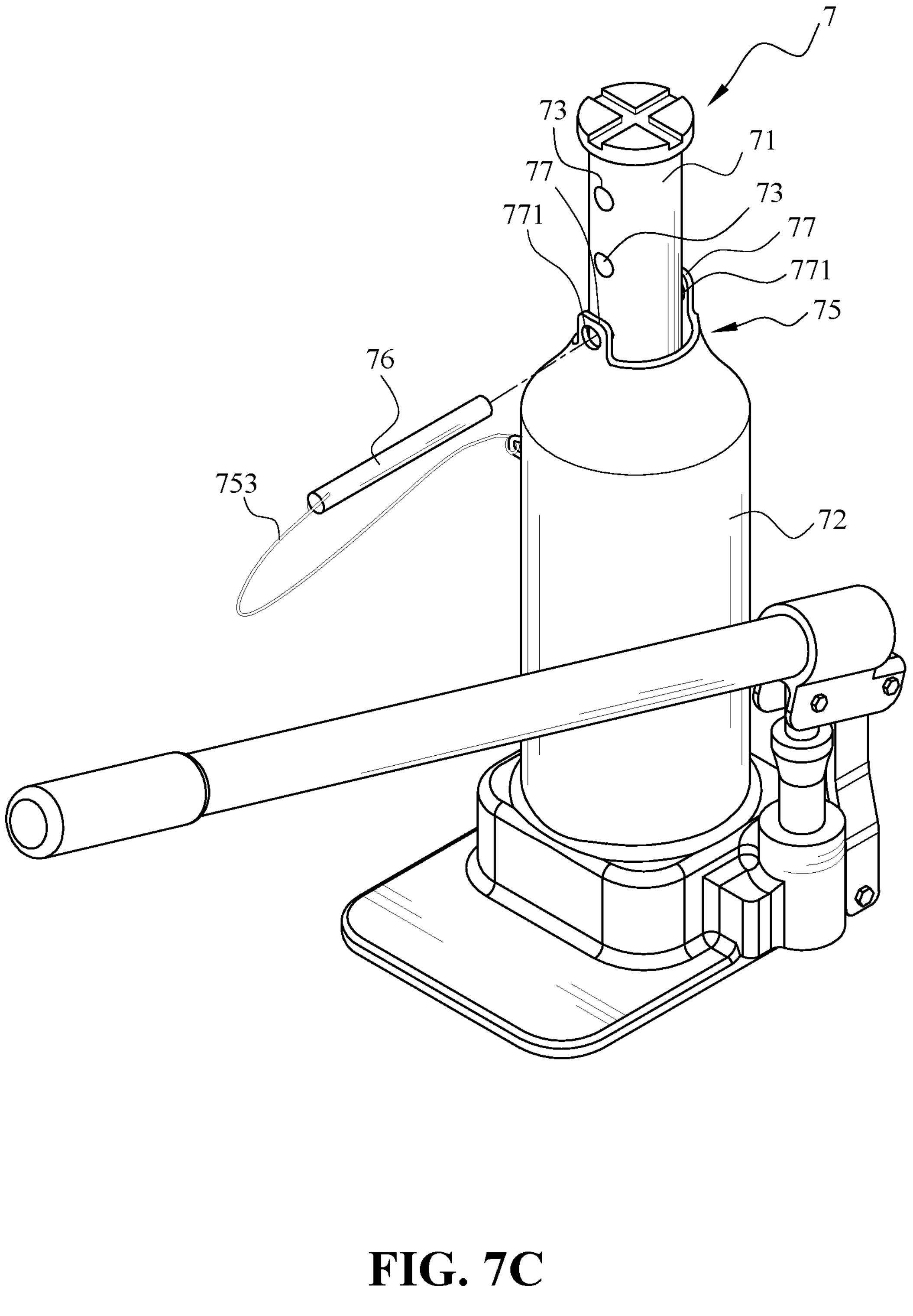
FIG. 7C illustrates an alternative hydraulic jack of FIG. 7A, in which ring 752 of FIG. 7A is omitted.

FIGS. 7A-7C illustrate an alternative hydraulic jack 7 in accordance with a third embodiment of the present invention.

FIG. 7A is a perspective view of hydraulic jack 7. The configuration of hydraulic jack 7 is similar to that of hydraulic jack 6 of FIGS. 6A-6B except that top portion 75 of large cylinder 72 of hydraulic jack 7 further includes two extended ears 77 located on opposite sides facing each other. Each of the extended ears 77 has a through hole 771 that aligns with each other and also align with any one of drill holes 73 of piston 71 when piston 71 is raised up. Top portion 75 extends upward and has a predetermined height that overlaps a portion of the lower end of piston 71 so that safety pin 76 can pass through holes 771 and one of drill holes 73 to secure piston 71 in place when piston 71 is raised up.

FIG. 7B is a partial side view of hydraulic jack 7 showing that safety pin 76 penetrate in a order of of through holes 751 of one extended ear 77, one drill hole 63 of piston 61, and through holes 651 of the other extended ear 77 to secure piston 61 in place when piston 61 is raised up.

Similar to FIGS. 6A and 6B, top portion 75 includes ring 752 that surrounds a circumference of top portion 65 and safety pin 76 is connected to ring 752 by means of chain or an extension cord 753. However, safety pin 76 may be connected with a chain or extension cord that is mounted on an exterior wall of large cylinder 72 of hydraulic jack 7, as designed in FIGS. 2 and 3. In some embodiments, safety pin 76 is a separate piece and does not connect to the body of top portion 75 or the body of large cylinder 72, as shown in FIGS. 13-15 that will be described later.

FIG. 7C illustrates an alternative design of hydraulic jack 7, in which ring 752 is omitted from top portion 75. Chain or extension cord 753 connecting safety pin 75 may be nailed, glued, or welded to the body of top portion 75 or connected to the body of top portion 75 by a small ring, similar to the manner shown in FIGS. 2 and 3, or mounted to the body of large cylinder 72. In the alternative design of FIG. 7C, safety pin 75 is connected to chain or extension cord 753 that is mounted on the exterior wall of large cylinder 72 of hydraulic jack 7 as an example.

It is noted that top portions 65 and 75 shown in FIGS. 6A-6B and 7A-7B are integrally mounted on the top of large cylinder 62 and 72 by molding, casting, hammering, wielding, and other appropriate manner. However, top portions 65 and 75 may be separate pieces that are mounted on the top of large cylinder 62 and 72 with appropriate mounting devices.

FIGS. 8A-8B and 9A-9B show that hydraulic jacks 8 and 9 in accordance with fourth and fifth embodiments of the present invention, in which the top portions of large cylinders 82 and 92 are separate security pieces 85 and 95 mounted on the top of large cylinders 82 and 92 of hydraulic jack 8 and 9 in a screw-threaded manner. In the exemplary embodiments of FIGS. 8A-8B and 9A-9B security pieces 85 and 95 are in a form of cylinders that, as described above, may be any appropriate form and not limited to the cylindrical form.

Figure 8A:
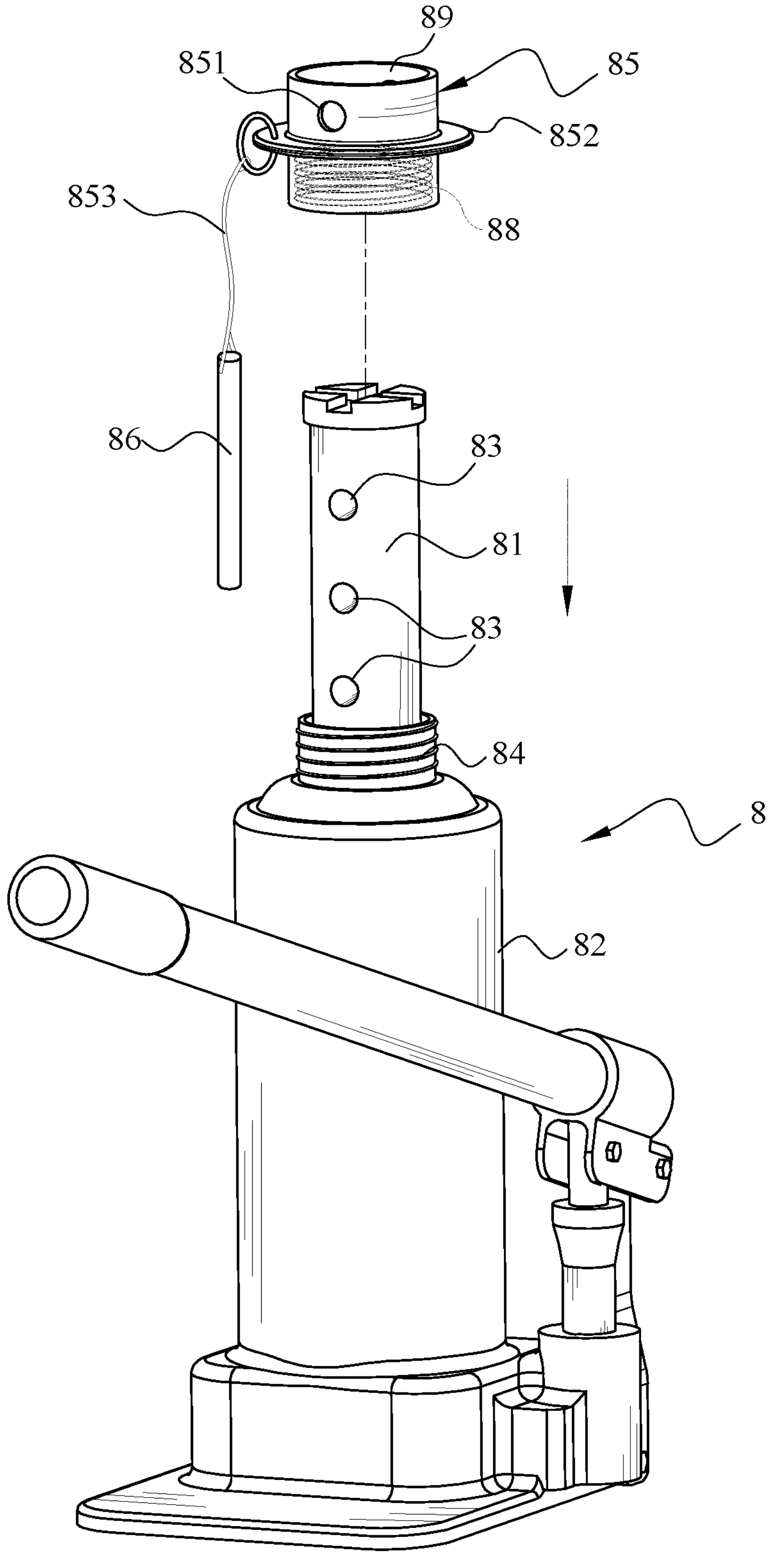
FIG. 8A illustrates an partial explosion view of a hydraulic jack in accordance with a fourth embodiment of the present invention.
Figure 8B:
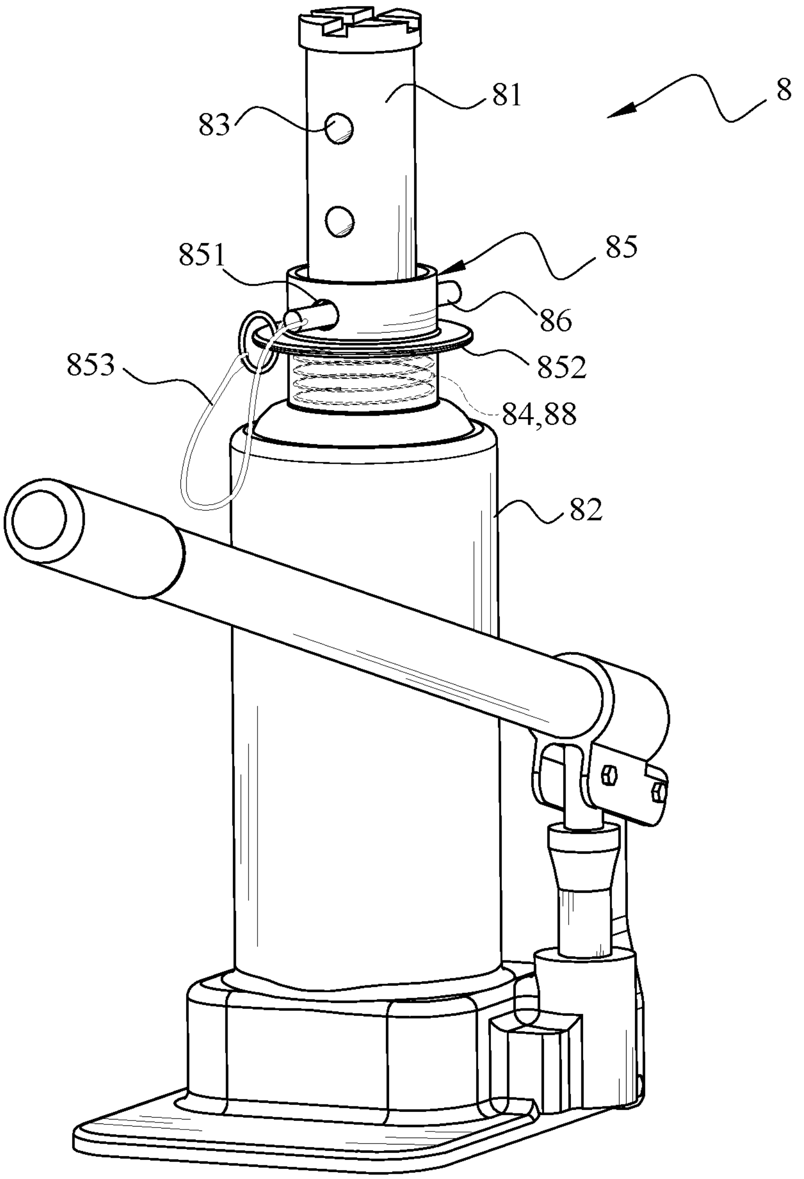
FIG. 8B illustrates a perspective view of the hydraulic jack of FIG. 8 when a safety pin is inserted.
Figure 9A:
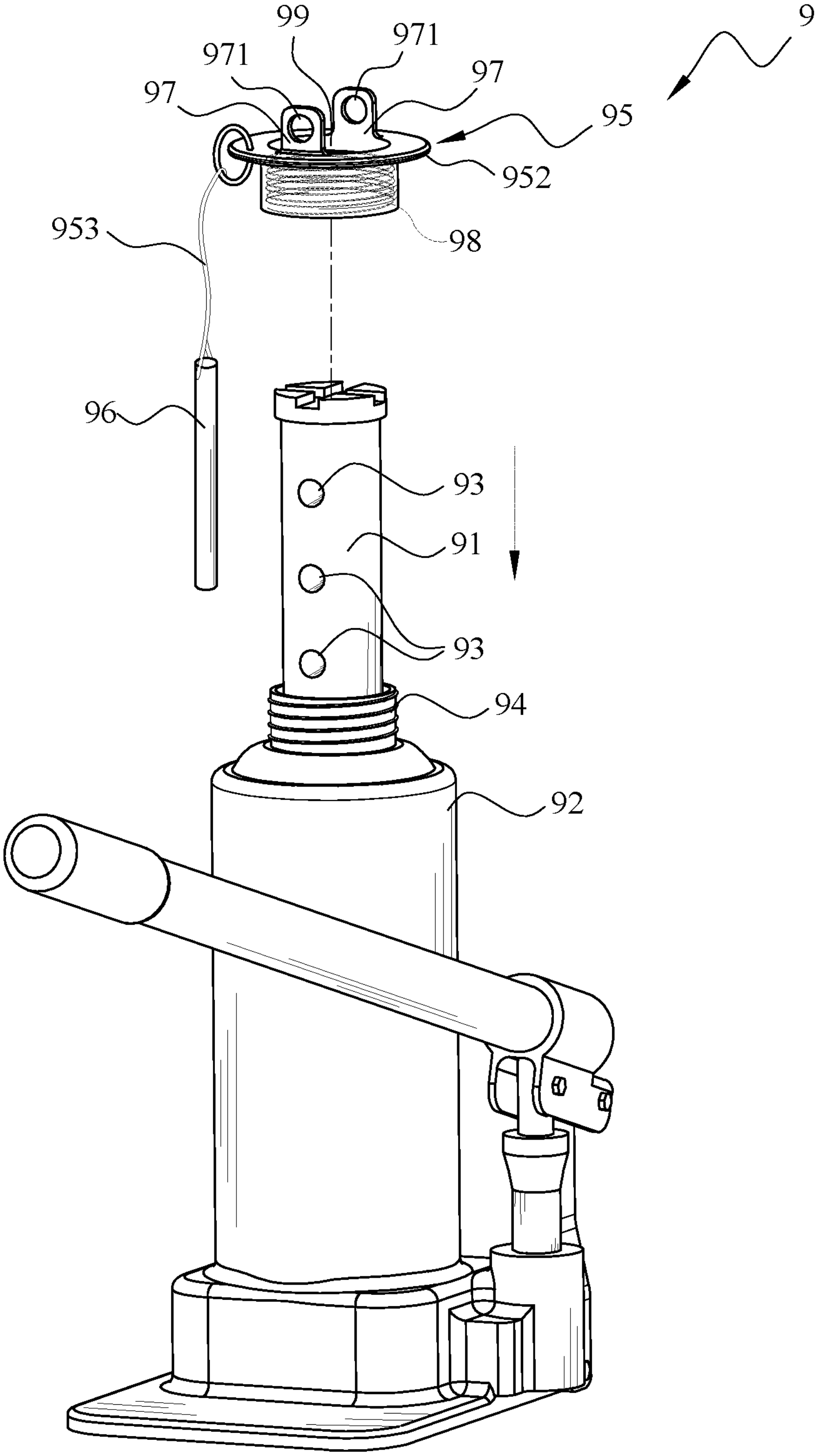
FIG. 9A illustrates a partial explosion view of a hydraulic jack in accordance with a fifth embodiment of the present invention.
Figure 9B:
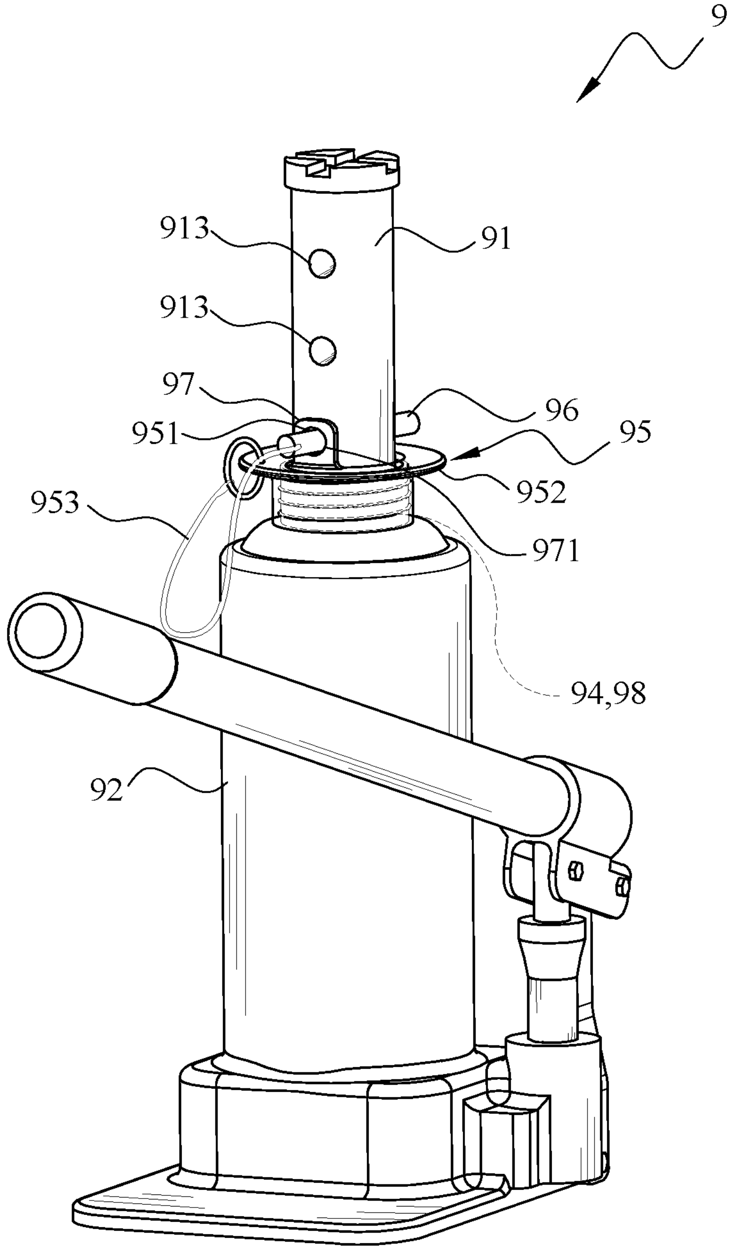
FIG. 9B illustrates a perspective view of the hydraulic jack of FIG. 9 when a safety pin is inserted.

FIGS. 8A and 9A are exploded views of hydraulic jacks 8 and 9 showing that separate security pieces 85 and 95 can be placed on a top of large cylinder 82 and 92. FIGS. 8B and 9B are perspective views of hydraulic jack 8 and 9 after security pieces 85 and 95 are placed on the top of large cylinder 92.

In the embodiments of FIGS. 8A-8B and 9A-9B, large cylinders 82 and 92 include top threaded portions 84 and 94 on the top thereof, of which diameters are larger than diameters of pistons 81 and 92 and surround the lower parts of pistons 81 and 91. Security pieces 85 and 95 are hollow cylinders with longitudinal through holes 89 and 99 extending from top to bottom of security pieces 85 and 95, and the inner diameters of longitudinal through holes 89 and 99 are larger than the diameters of piston 81 and 91 so that security pieces 85 and 95 can insert through piston 81 and 91 to connect with top threaded portions 84 and 94 of large cylinders 82 and 92. Each of security pieces 85 and 95 includes lower threaded portion 88 and lower threaded portion 98 (shown in dashed lines) located on a lower circumferential portion of an inner wall of security piece 85 and 95. The lower threaded portions 88 and 98 of security pieces 85 and 95 and the upper spiral portions 84 and 94 are designed to fit and tighten together by a rotating motion, as shown in FIGS. 8B and 9B. In FIGS. 8B and 9B, the lower parts of security pieces 85 and 95 are illustrated in transparent to show that security pieces 85 and 95 are mounted on larger cylinder 82 and 92 through an engagement between lower spiral portions 88 and 98 and top spiral portions 84 and 94.

The shape of security piece 85 of FIG. 8A is similar to that of top portion 65 of FIG. 6A. A major difference is security piece 85 is a separate piece, but top portion 65 is integrally mounted on the top of large cylinder 62 by molding, casting, welding, hammering, or any suitable method. Like top portion 65, security piece 85 also includes a pair of through holes 851 located in opposite locations and aligned with any one of drill holes 83 of piston 81 when piston 81 is raised up. Safety pin 86 is connected to ring 852 of security piece 85 through chain or extension cord 853.

The shape of security piece 95 of FIG. 9A is similar to that of top portion 75 of FIG. 7A. As shown, security piece 95 has a pair of ears 97 opposite to each other and each of the pair of ears 97 has a through hole 971 aligned with any drill hole 93 of piston 91 so that safety pin 96 can penetrate through the pair of through holes 971 and drill hole 93 of piston 91.

The embodiments of FIGS. 8A-8B and 9A-9B show that safety pins 86 and 96 are connected to rings 852 and 952 mounted circumferentially on security pieces 85 and 95 by means of extension cords 853 and 953. As described above with reference to FIGS. 6A, rings 852 and 952 may be omitted and chain or extension cords 853 and 953 connecting safety pin 86 and 96 may be mounted on the bodies of top portions 85 and 95, as shown in FIG. 6C, or on the bodies of large cylinders 82 and 92, as shown in FIGS. 2 and 7C. Safety pins 86 and 96 may also be a separate piece that does not connect to any part of hydraulic jacks 8 and 9, as shown in FIGS. 13-15 that will be described later.

Further, the shapes of the security pieces 85 and 95 are not limited to the circular cylinders of FIGS. 8A and 9A. The security pieces 85 and 95 may be in a shape of prism, hexagon, pentagon or the like with a longitudinal through hole in the center thereof.

Figure 10A:
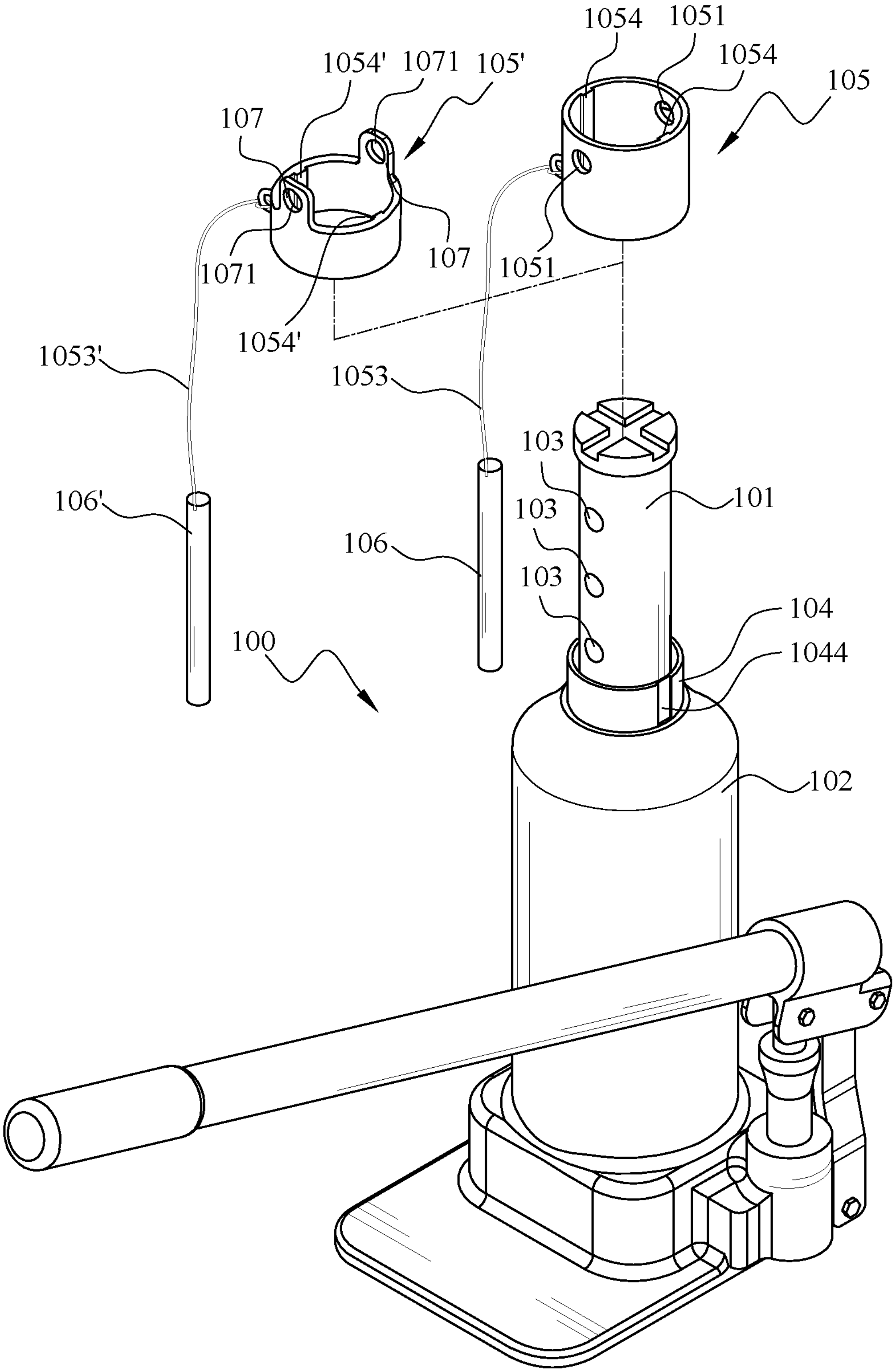
FIG. 10A illustrates a partial explosion view of a hydraulic jack in accordance with a sixth embodiment of the present invention.
Figure 10B:
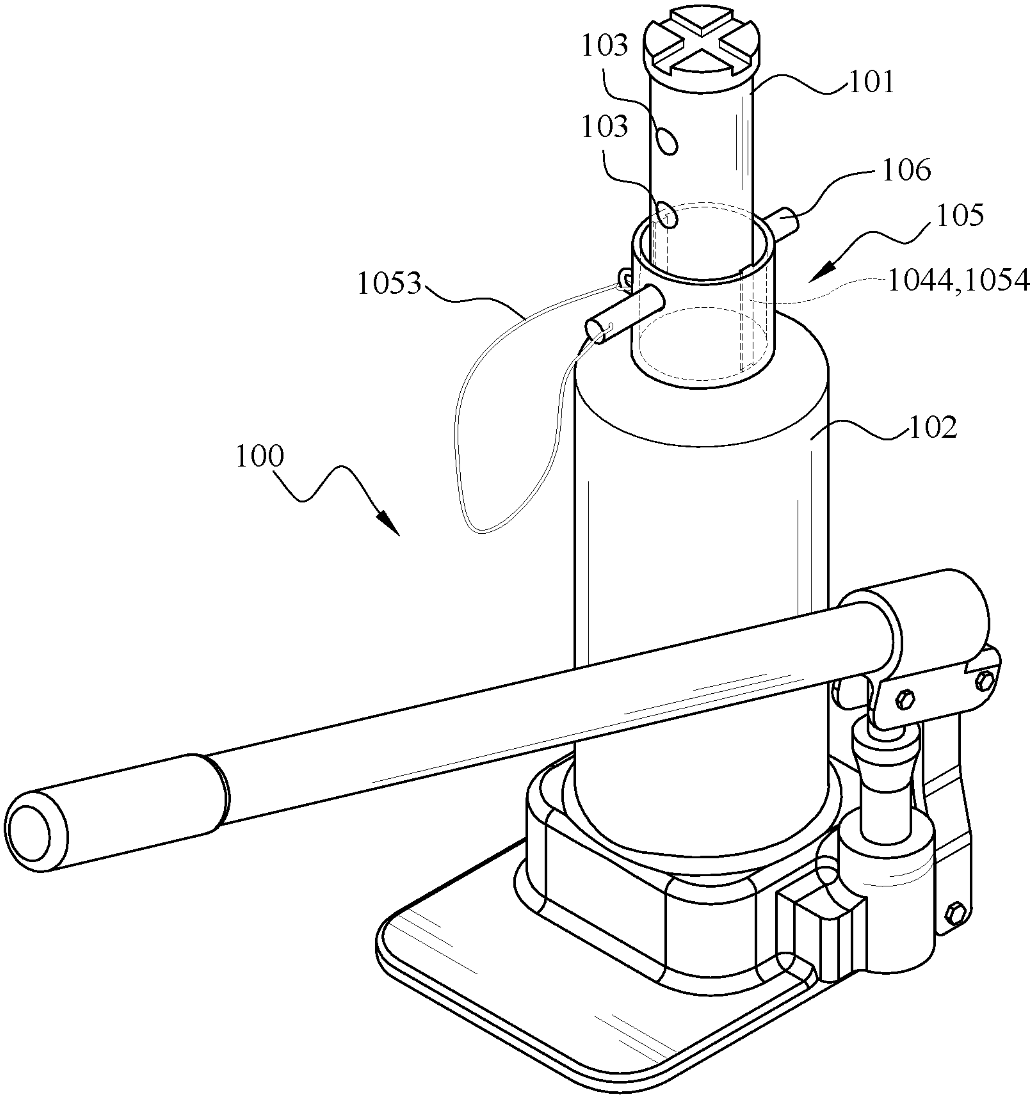
FIG. 10B illustrates a perspective view of the hydraulic jack of FIG. 10 showing security piece 105 is attached on the hydraulic jack and a safety pin is inserted.

FIGS. 10A-10B illustrate a hydraulic jack 100 in accordance with a sixth embodiment of the present invention. FIG. 10A is an exploded view of hydraulic jack 10 showing that security pieces 105 and 105' can be alternatively placed on the top of large cylinder 102. FIG. 10B is a perspective view of hydraulic jack 100 after security piece 105 is placed on the top of large cylinder 102. In the embodiment illustrated in FIGS. 10A and 10B, security pieces 105 and 105' do not include circumferential rings. Safety pins 105 and 105' are connected to the bodies of security pieces 105 and 105' by chain or extension cord 1053 and 1053'.

In the embodiment of FIG. 10A, top portion 104 of large cylinder 102 includes at least two recesses 1044 on outer circumference thereof. Security piece 105 has a similar look to that of security piece 85 of FIG. 8A except that there is no lower threaded portion but at least one pair of protruded parts 1054 (or male parts) on an inner wall of cylinder piece 105. The locations of protruded pieces 1054 match the locations of the pair of recesses 1044 of top portion 104 so that the pair of extended pieces 1054 engage with the pair of recesses 1044 when security piece 105 is placed on the top of large cylinder 102. Similar to security piece 85 of FIG. 8A, security piece 105 also includes a pair of through holes 1051 and safety pin 106 connects to the body of cylinder piece 105 by means of wire or chain 1053.

FIG. 10A further illustrates security piece 105' that can also be used to attach on top portion 104 of large cylinder 102. Security piece 105' is similar to security piece 95 of FIG. 9A except there is no lower threaded portion in security piece 105' but at least a pair of protruded pieces 1054' on an inner wall of security piece 105'. That is, security piece 105' includes a pair of ears 107 extended upwardly facing each other. Each of the pair of ears 107 includes through hole 1071 that aligns with any one of drill holes 103 of piston 101. Safety pin 106' connects to cylinder piece 105' by means of wire or chain 1053' and is insertable to the through holes 1071 and one drill hoe 103 when piston 102 is raised up to secure piston 102 in place.

Likewise, safety pins 106 and 106' may connect to the exterior wall of large cylinder 102 by a chain or extension cord, as shown in FIG. 7C. Furthermore, safety pins 106 and 106' may also be separate pieces that do not connect to any part of hydraulic jack 10.

In accordance with the preferred embodiments, safety pins 86, 96, 106, and 106' and security pieces 85, 95, 105, and 105' can be sold individually or as a set sold separately from hydraulic jacks 8, 9 and 10. The forms and shapes of top portions 65 and 75 and security pieces 85, 95, 105, and 105' are also not limited to the designs shown in FIGS. 6A-10A. Any form and shape that provides similar functions can also be used. As described above with regard to FIGS. 1-3, safety pins 66, 76, 86, 96, 106, and 106' may have a slope to facilitate the safety pin access to through holes 651, 751, 851, 951, 1051, and 1051' of top portions 65 and 75 and security pieces 85, 95, 105 and 105' and drill holes 63, 73, 83, 93, and 103 of piston 61, 71, 81, 91, and 101.

Moreover, as shown in FIG. 2 (although not shown in FIGS. 6-11) safety pin 66, 76, 86, 96, 106, 106' may include a spiral screw on one end that screws the safety pin toward piston 61, 71, 81, 91, and 101 after the safety pin penetrates through drill hole 63, 73, 83, 93, and 103 to provide more security. Any of safety pins 66, 76, 86, 96, 106, 106' may have a bullet bean (as bullet bean 361 of FIG. 3) that is extended out after the safety pin in inserted into a drill hole as so to prevent the safety pin from falling off the drill hole.

FIGS. 11-14 illustrate alternative designs for security pieces 115, 125, 135, and 145 in accordance with different preferred embodiments of the present invention. It is noted that safety pins 116, 126, 136, and 146 in FIGS. 11-14 are separate pieces and do not connect to hydraulic jacks 110, 120, 130, and 140. However, safety pins 116, 126, 136, and 146 may be connected to the bodies of large cylinders 112, 122, 132, and 142, or the bodies of security pieces 115, 125, 135, and 145 as disclosed in FIGS. 6A-6C and 7C or in any appropriate manner.

Figure 11:
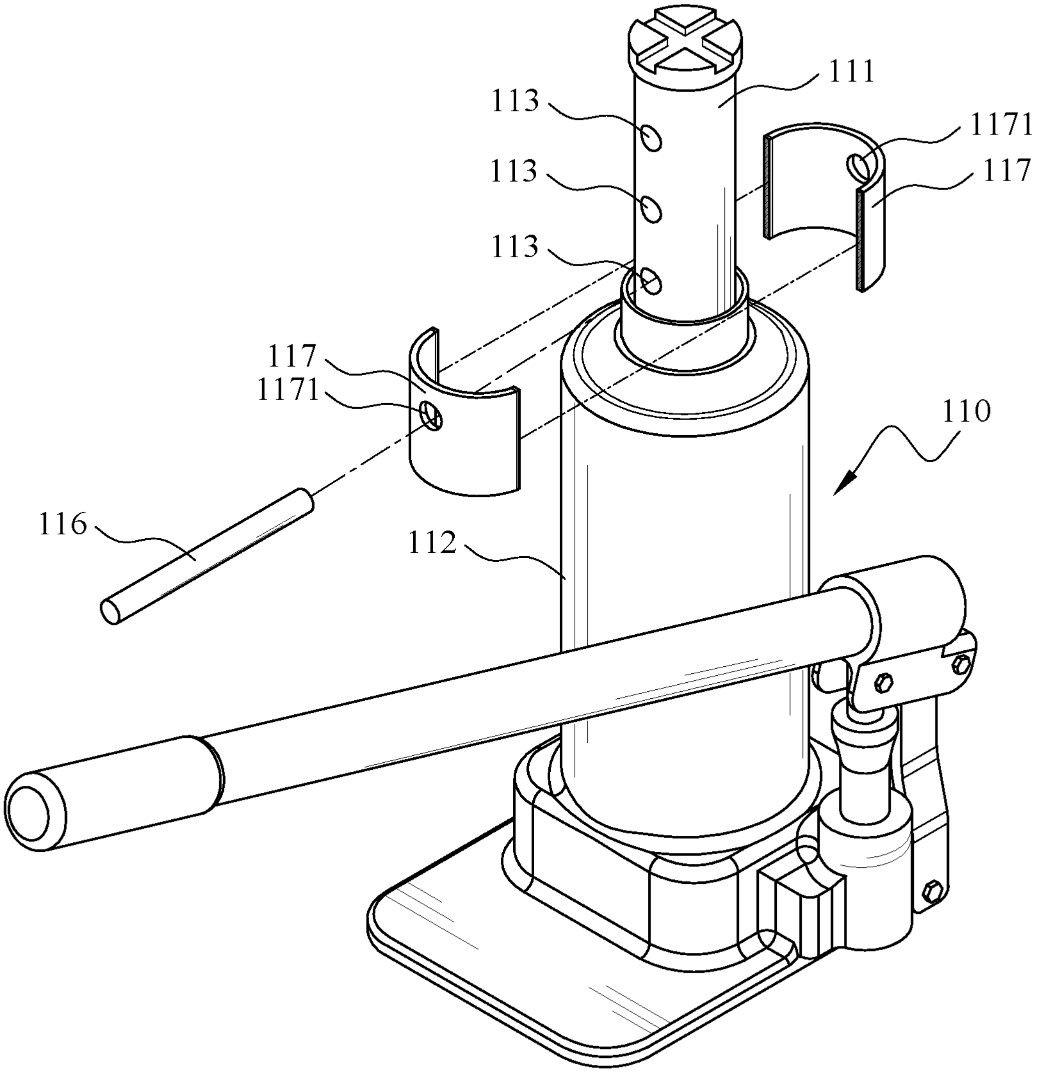
FIG. 11 illustrates an alternative design of a hydraulic jack in accordance with a seventh embodiment of the present invention.

In FIG. 11, security piece 115 is made of two curved magnets 117 that form a cylinder when attached together. Each of the curved magnets 117 may include a through hole 1171. When in use, the two curved magnets are attached at the top of large cylinder 112 of hydraulic jack 110 to form a cylinder surrounding the lower part of piston 111. Through holes 1171 align with any of drill holes 113 so that safety pin 116 can penetrate through holes 1171 and one of drill holes 113 when piston 111 is raised up. Safety pin 116 can be a separate part or be mounted to hydraulic jack 110 at any appropriate place.

Figure 12:
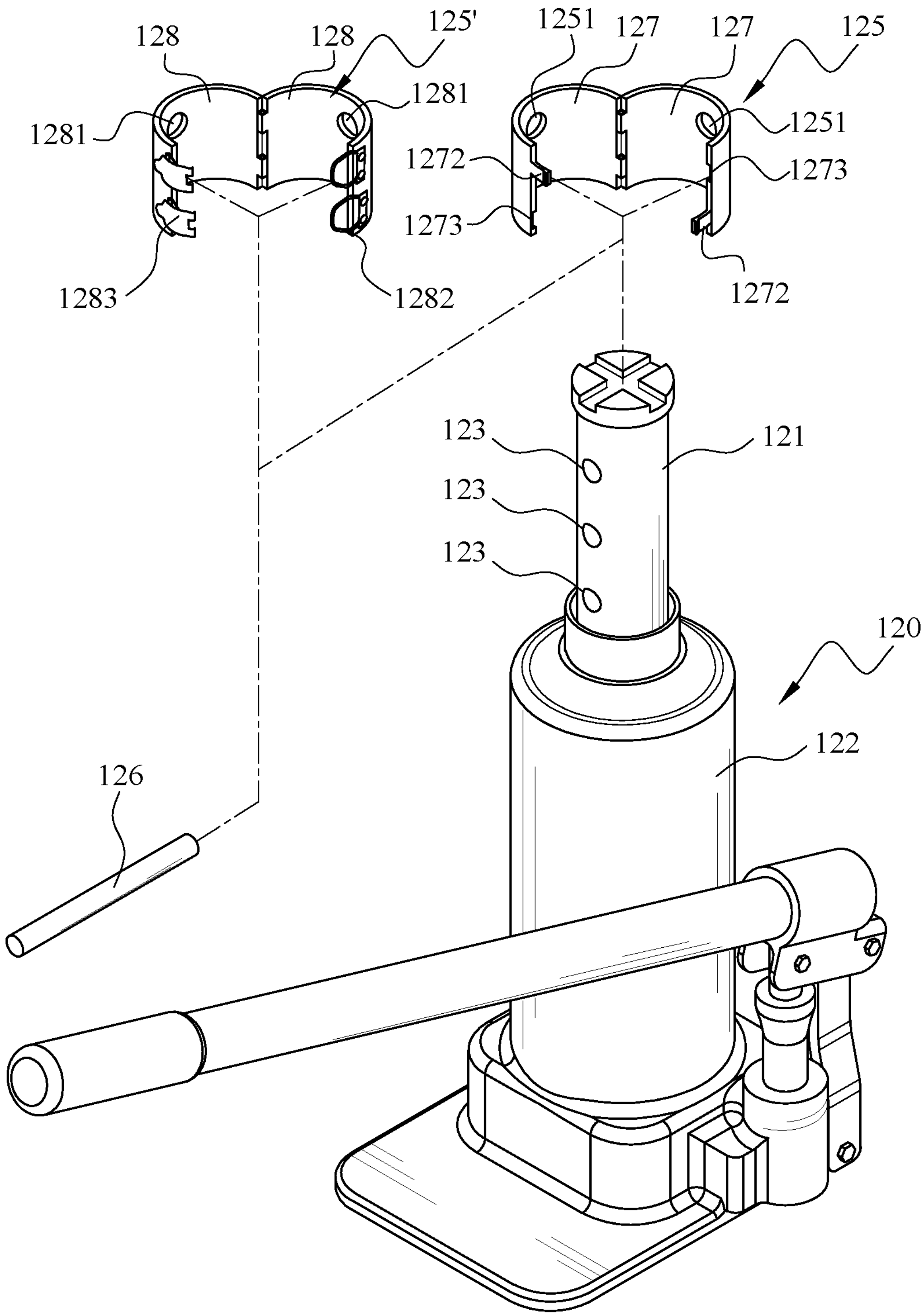
FIG. 12 illustrates another alternative design of a hydraulic jack in accordance with an eighth embodiment of the present invention.

FIG. 12 illustrates security piece 125 that is mounted on a top of large cylinder 122 of hydraulic jack 120 including two circular halves 127 that form a hollow cylinder when attached together. The circular halves 127 are pivotally connected at one end thereof, and include engaging parts at the other ends. For example, each of the two circular halves 127 has male engaging part 1272 and female engaging part 1273 located in corresponding locations so that the two circular halves 127 can be attached together by the engagements of male and female engaging parts 1272 and 1273 to form a cylinder.

FIG. 12 further illustrates an alternative design of security piece 125'. Similar to security piece 125, security piece 125' also includes two circular halves 128 pivotally connected at one end thereof and include a locking buckle device at the other ends. As shown in the drawings, one circular half 128 includes buckle 1282 and one circular half 128 includes locking part 1283 so that the two halves 128 may be attached together by the engagement of buckle 1282 and locking part 1283. Each of the circular halves 127 and the halves 128 further include through hole 1271 and 1281 that align with any one of drill holes 123 of piston 121 when attached together and placed on the top of large cylinder 122 of hydraulic jack 120. Safety pin 126 can penetrate through holes 1271 and one of drill holes 123 when piston 121 is raised up. Safety pin 126 can be a separate part or be mounted to hydraulic jack 120 at any appropriate place.

FIG. 13 illustrates another design of hydraulic jack 130 that includes security piece 135. In FIG. 13, security piece 135 has a similar look to security piece 85 of FIG. 8A, but does not have lower threaded portion as in security piece 85. In this embodiment, a top surface of large cylinder 132 has a circular recess 134 of which the diameter is substantially the same diameter of security piece 135 so that security piece 135 may be placed in the circular recess 134 and secured therein. Security piece 135 may include a pair of through holes 1351 located in opposite locations and aligned with any of drill holes 133 of piston 131. Safety pin 136 penetrates the pair of through holes 1351 and one drill hole 133 to secure piston 131 in place.

Alternatively, the bottom of security piece 135 may include magnets or made of magnetic materials 1355 and circular recess 134 may also include magnets or made of magnetic materials 1345. Magnets or magnetic materials 1355 has an opposite magnetism from magnets or magnetic materials 1345 so that they can be attractive together to secure security piece 135 on the top of large cylinder 132.

FIG. 14 illustrates a different design of hydraulic jack 140, in which a top portion of large cylinder 142 includes two or more recesses 144 and security piece 145 includes two or more extensions 1452 corresponding to the two or more recesses 144. Security piece 145 is attached on the top of large cylinder 142 by engaging two or more extensions 1452 into two or more recesses 144.

As in the embodiment of FIG. 13, the two or more extensions 1452 may be made of magnetic material and the two or more recesses 144 may include magnetic materials or magnets with an opposite magnetism from that of the two or more extensions 1452. Therefore, security piece 145 may be attached and secured on the top of large cylinder 142 with a magnetic force.

The manners for mounting a security piece on the top of a large cylinder of a hydraulic jack are not limited to the embodiments illustrated in FIGS. 6-14 only. Any appropriate manner that provides a security piece on the lower portion of a piston to avoid a heavy weight from abruptly collapsing on the top of the large cylinder may also be included in the preferred embodiments in accordance with the present invention.

Furthermore, according to the preferred embodiments, the through holes shown in FIGS. 6-14 may be omitted. In these cases, safety pins 66, 76, 86, 96, 106, 116, 126, 136, and 146 are used to penetrate any of drill holes of piston 61, 71, 81, 91, 101, 111, 121, 131, and 141 only.

FIG. 15 illustrates one example of hydraulic jack 150 in which security piece 115 has no through holes. Security piece 115 sits on the top of large cylinder 152 and has a height above the bottom of piston 151. In this exemplary embodiment, safety pin 116 passes through one drill hole 153 of piston 151, as shown in FIG. 15. Security piece 155 may be integrally formed on top of large cylinder 152, or a separate piece that is mounted on the top of large cylinder 152 in a manner as shown in any of FIGS. 8-14 (but not limited to). As any of top portions 65 and 75 and security pieces 85, 95, 105, 105', 115, 125, 135, and 145 has a height that surrounds a lower portion of pistons 61, 71, 81, 91, 101, 111, 121, 131, and 141, so they can be used as buffers and provide additional protection for abrupt collapses of pistons 61, 71, 81, 91, 101, 111, 121, 131, and 141 when hydraulic jack 6, 7, 8, 9, 100, 110, 120, 130, and 140 are malfunctioning.

The terminology used herein is for the purpose of describing particular embodiments only and is not intended to be limiting of the invention. As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operations, elements, components, and/or groups thereof.

The corresponding structures, material, acts, and equivalents of all means or steps plus function elements in the claims below are intended to include any structure, material or act for performing the function in combination with other claimed elements that are specifically claimed. The description of the present invention has been presented for purposes of illustration and description, but is not intended to be exhaustive or limited to the invention in the form disclosed. Many modifications and variations will be apparent to those of ordinary skill without departing from the scope and spirit of the invention. The embodiment was chosen and described in order to best explain the principles of the invention and the practical application, and to enable others of ordinary skill in the art to understand the invention for embodiments with various modifications as are suited to the particular use contemplated.

It will be apparent to those skilled in the art that various modifications to the disclosed may be made without departing from the spirit or scope of the invention. Thus, it is intended that the present invention covers the modifications and variations disclosed above provided that these changes come within the scope of the claims and their equivalents.

What is claimed is:

1. A hydraulic jack, comprising:

a hydraulic cylinder storing hydraulic fluid inside;

a piston installed in the hydraulic cylinder that is raised up from the hydraulic cylinder by a pressure of the hydraulic fluid stored in the hydraulic cylinder, wherein the piston has at least one drill hole on a body thereof, the drill hole has a determined diameter and is perpendicular to the piston;

a security portion located on a top of the hydraulic cylinder that has a diameter larger than that of the piston and a height large enough to surround a lower part of the piston; and a safety pin that passes through one of the at least one drill hole of the piston when the piston is raised up, wherein the security portion is a part of the hydraulic cylinder and is mounted integrally on the top of the hydraulic cylinder by welding, casting, or hammering.

2. The hydraulic jack of claim 1, wherein the safety pin locates on top of the security portion after inserting into one the at least one drill hole of the piston.

3. The hydraulic jack of claim 1, wherein the security portion incudes a pair of through holes located on a body of the security part in opposite positions and each of the pair of through holes aligns with the at least one drill hole and wherein the safety pin penetrates in an order of a first through hole of the pair of the through holes, one of the at least one drill hole of the piston, and a second through hole of the pair of through holes to secure the piston in place.

4. The hydraulic jack of claim 1, wherein the security safety pin is attached to the security part through an extension cord, and wherein the extension cord is mounted on either one of exterior wall of the hydraulic jack and the security part.

5. The hydraulic jack of claim 1, wherein the security portion comprises a pair of ears extended upwardly from an top of the security portion, each of the pair of ears faces each other, and wherein each of the pair of ears comprises a through hole that aligns with the at least one drill hole of the piston.

6. A hydraulic jack, comprising:

a hydraulic cylinder storing hydraulic fluid inside, the hydraulic cylinder including a cylindrical body and a top portion, wherein the top portion includes a fastening part;

a piston installed in the hydraulic cylinder that is raised up from the hydraulic cylinder by a pressure of the hydraulic fluid stored in the hydraulic cylinder, wherein the piston is used to lift up a heavyweight, and wherein the piston has at least one drill hole on a body thereof, the drill hole has a determined diameter and is perpendicular to the piston;

a security piece that is attachable to the top portion of the hydraulic cylinder by means of the fastening part, the security piece including a longitudinal central opening, of which a size is larger than the diameter of the piston so that the security piece can pass through the piston from top to bottom to contact with the top portion of the hydraulic cylinder, wherein the security piece has a height large enough so that the security piece surrounds a lower portion of the piston; and a safety pin for inserting into one of the at least one drill hole of the piston when the piston is raised up to secure the piston in place, wherein the fastening part of the top portion comprises a first magnet, and a bottom of the security piece comprises a second magnet, and wherein the first magnet and the second magnet attract to each other when the security piece attaches to the top portion of the hydraulic cylinder.

7. The hydraulic jack of claim 6, wherein the security piece comprises a pair of through holes on an outer wall thereof in opposite positions, and the pair of through holes are aligned with the at least one drill hole of the piston, and wherein the safety pin passes in an order of one of the pair of through holes of the security piece, one of the at least one drill hole of the piston, and the other one of the pair of through holes of the security piece.

8. The hydraulic jack of claim 6, wherein the first magnet is formed of two half-magnets that are attachable to form a hollow cylinder placed on the top portion of the hydraulic cylinder.

9. A hydraulic jack, comprising:

a hydraulic cylinder storing hydraulic fluid inside, the hydraulic cylinder including a cylindrical body and a top portion, wherein the top portion includes a receiving device on a top surface thereof;

a piston installed in the hydraulic cylinder that is raised up from the hydraulic cylinder by a pressure of the hydraulic fluid stored in the hydraulic cylinder, wherein the piston is used to lift up a heavyweight, and wherein the piston has at least one drill hole on a body thereof, the at least one drill hole has a determined diameter and is perpendicular to the piston;

a security piece that is attachable to the top portion of the hydraulic cylinder by means of a receiving device, the security piece including a longitudinal opening of which a size larger than the diameter of the piston so that the security piece can pass through the piston from top to bottom to be placed in the receiving device of the top portion of the hydraulic cylinder, wherein the security piece has a height large enough so that the security piece surrounds a lower portion of the piston; and a safety pin that inserts to one of the at least one drill hole of the piston when the piston is raised up to secure the piston in place, wherein the receiving device is a circular recess located on the top portion of the hydraulic cylinder, of which the circumferential dimension is substantially the same as a bottom circumferential dimension of the security piece, and wherein the security piece is placed in the circuit recess of the top portion of the hydraulic cylinder.

10. The hydraulic jack of claim 9, wherein the safety pin locates on top of the security piece after inserting to one of the at least one drill hole of the piston.

11. The hydraulic jack of claim 9, wherein the security part incudes a pair of through holes located on a body of the security part in opposite positions and each of the pair of through holes aligns with the at least one drill hole of the piston, the safety pin penetrates in an order of a first through hole of the pair of the through holes, one of the at least one drill hole of the piston, and a second through hole of the pair of through holes to secure the piston in place.

12. The hydraulic jack of claim 9, wherein the receiving device includes a magnet and a bottom of the security piece includes a magnetic material, the magnet of the receiving device has an opposite magnetism from the magnetic material of the security piece so that the security piece can be attached on the receiving device by means of a magnetic attraction.

13. The hydraulic jack of claim 9, wherein the security piece is made of two half magnetic parts that can be attached together and placed on the receiving device of the large cylinder.

14. The hydraulic jack of claim 9, wherein the security piece includes two half parts, one ends of the two half parts are pivotally connected and the other ends of the two half parts are engageable to form an enclosed piece on the receiving device of the large cylinder.

15. The hydraulic jack of claim 9, wherein the security piece is a cylinder with a hollow central opening that passes through the piston to attach on the receiving device of the large cylinder.

16. A hydraulic jack, comprising:

a hydraulic cylinder storing hydraulic fluid inside, the hydraulic cylinder including a cylindrical body and a top portion, wherein the top portion includes a fastening part;

a piston installed in the hydraulic cylinder that is raised up from the hydraulic cylinder by a pressure of the hydraulic fluid stored in the hydraulic cylinder, wherein the piston is used to lift up a heavyweight, and wherein the piston has at least one drill hole on a body thereof, the at least one drill hole has a determined diameter and is perpendicular to the piston;

a security piece that is attachable to the top portion of the hydraulic cylinder, the security piece including a longitudinal opening of which a size larger than the diameter of the piston so that the security piece can pass through the piston from top to bottom to contact with the top portion of the hydraulic cylinder, wherein the security piece has a height large enough so that the security piece surrounds a lower portion of the piston, wherein the security piece comprises a pair of through holes on an outer wall thereof in opposite positions, and the pair of through holes are aligned with the at least one drill hole of the piston, wherein an upper end of an external wall of the top portion of the hydraulic cylinder comprises at least one recess and a lower portion of an inner wall of the security piece comprises at least one protrusion, wherein the at least one protrusion and the at least one recess engage together when the security piece is attached to the top portion of the hydraulic cylinder, and a safety pin that inserts to in an order of one of the pair of through holes of the security piece, one of the at least one drill hole of the piston, and the other one of the pair of through holes of the security piece when the piston is raised up to secure the piston in place.

* * * * *